United States Patent

Ohtake

(10) Patent No.: US 7,061,686 B2
(45) Date of Patent: Jun. 13, 2006

(54) VARIABLE FOCAL LENGTH LENS SYSTEM

(75) Inventor: Motoyuki Ohtake, Saitama (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 10/742,906

(22) Filed: Dec. 23, 2003

(65) Prior Publication Data

US 2004/0136086 A1 Jul. 15, 2004

(30) Foreign Application Priority Data

| Dec. 27, 2002 | (JP) | ................ 2002-381663 |
| Dec. 27, 2002 | (JP) | ................ 2002-381682 |
| Jan. 22, 2003 | (JP) | ................ 2003-013856 |

(51) Int. Cl.
*G02B 15/14* (2006.01)

(52) U.S. Cl. .................................... 359/687

(58) Field of Classification Search ............... 359/687, 359/683–685
See application file for complete search history.

(56) References Cited

U.S. PATENT DOCUMENTS

| 4,634,236 A | | 1/1987 | Masumoto ............ 359/684 |
| 4,696,553 A | * | 9/1987 | Tsuji et al. ............ 359/683 |
| 5,412,507 A | * | 5/1995 | Sato ..................... 359/687 |
| 5,572,277 A | | 11/1996 | Uzawa et al. .......... 359/686 |
| 6,016,228 A | | 1/2000 | Uzawa ................. 359/687 |
| 6,353,506 B1 | | 3/2002 | Ohashi ................. 359/687 |
| 6,404,561 B1 | * | 6/2002 | Isono et al. ........... 359/683 |
| 6,456,441 B1 | | 9/2002 | Hoshi ................... 359/687 |
| 6,633,437 B1 | | 10/2003 | Hoshi et al. ........... 359/687 |
| 2003/0063395 A1 | * | 4/2003 | Saruwatari ............ 359/687 |

FOREIGN PATENT DOCUMENTS

| JP | 57-5012 | | 1/1982 |
| JP | 06003592 A | * | 1/1994 |
| JP | 7-5361 | | 1/1995 |
| JP | 2001-56436 | | 2/2001 |
| JP | 2001-188170 | | 7/2001 |
| JP | 2001-242379 | | 9/2001 |
| JP | 2001-356269 | | 12/2001 |

* cited by examiner

Primary Examiner—Scott J. Sugarman
(74) Attorney, Agent, or Firm—Miles & Stockbridge PC

(57) ABSTRACT

A variable focal length lens system realizing compactness and high zoom ratio is provided. The lens system includes four lens groups that are, in order from an object, a first lens group having positive refractive power, a second lens group having negative refractive power, a third lens group having positive refractive power, and a fourth lens group having positive refractive power. When the state of lens group positions varies from a wide-angle end state to a telephoto end state, at least the first lens group is moved to the object such that a distance between the first and the second lens groups increases, a distance between the second and the third lens groups decreases, and a distance between the third and the fourth lens groups varies. An aperture stop is arranged in the vicinity of the third lens group. Given conditional expressions are satisfied.

22 Claims, 9 Drawing Sheets

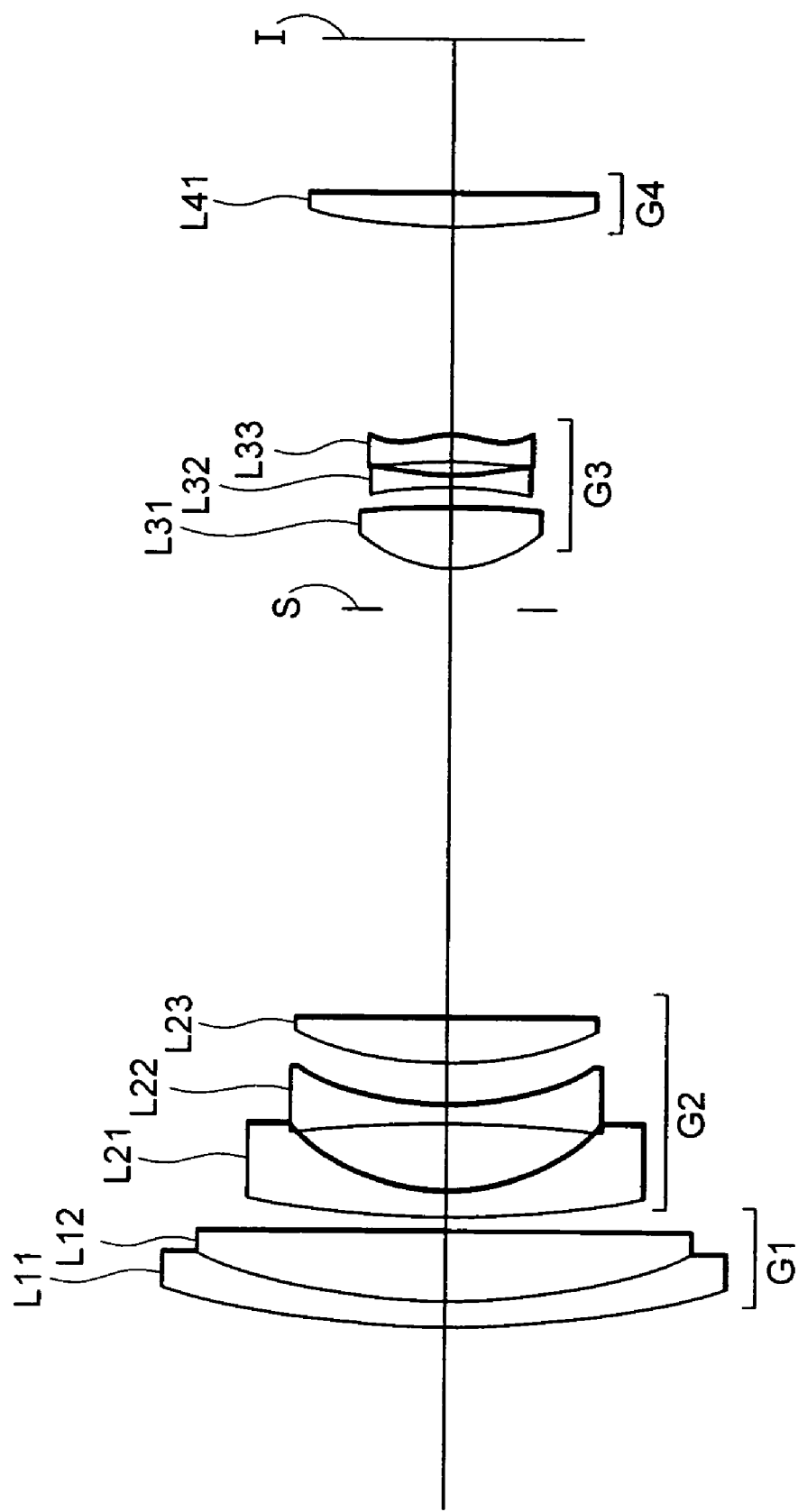

VARIABLE FOCAL LENGTH LENS SYSTEM

This application claims the benefit of Japanese Patent applications No. 2002-381663 filed Dec. 27, 2002, No. 2002-381682 filed Dec. 27, 2002 and No. 2003-013856 filed Jan. 22, 2003 which are hereby incorporated by reference.

BACKGROUND OF THE INVENTION

1. Field of the Invention

The present invention relates to a variable focal length lens system.

2. Related Background Art

As for recording an image of a subject in a camera, various methods using an imaging device applied a photoelectric converter such as a CCD (Charge Coupled Device) and a CMOS (Complementary Metal Oxide Semiconductor) have been known. In the recording of an image of a subject according to the method, an image of a subject is formed on an imaging device through an optical system such as a zoom lens, and the light quantity of the image is converted into an electric output by a photoelectric converter to be stored in a memory medium.

With recent progress in micro fabrication, CPU (Central Processing Unit) gains more processing speed and a memory medium becomes high degree of integration. Accordingly, a large amount of image data that are yet to be handled can be processed quickly. Moreover, an imaging device also becomes high degree of integration and is miniaturized. The high integration of an imaging device makes it possible to record high spatial frequency. Miniaturizing the imaging device makes it possible for a camera body to become compact.

However, the high integration and miniaturizing of an imaging device narrow the light detecting area of each photodetector. Accordingly, electrical output falls to produce a lot of noise. In order to prevent this, the optical system is made to be faster to increase the light amount reaching the imaging device. Moreover, a minute lens element that is so-called a micro-lens-array may be arranged directly in front of each photoelectric detector.

The micro-lens-array arranged directly in front of the photoelectric detector can guide light falling between adjacent photoelectric detectors to the photoelectric detector. However, when the exit pupil of the optical system approaches the imaging device, in other words, when the angle between the principal ray incident to the imaging device and the optical axis becomes large, off-axis ray proceeding to periphery of the image makes a large angle not to reach the imaging device, so that it causes insufficient light amount. Accordingly, by means of arranging a micro-lens-array directly in front of the photoelectric detector, the light falling between adjacent photoelectric detectors can be guided to the photoelectric detector as described above, but it inevitably imposes restriction on the exit pupil position of the optical system.

A digital still camera, so called, which records an image of a subject by an imaging device using a photoelectric detector has a merit that you can easily confirm shot image without development and comfortably handle image data. On the other hand, image quality is inferior to that of a film camera and you have to connect it to an instrument such as a personal computer to process the imaging data. Therefore, the diffusion of the digital still camera has not been increased. Owing to recent progress in imaging quality and diffusion of the instrument, digital still cameras have been using generally.

In order to improve image quality, it is inevitable that optical performance of the optical system is to be increased in addition to high integration of the imaging device. Moreover, increasing the zoom ratio of the optical system provides more degree of freedom for shooting to photographers and has the following merits that they can shoot a close-up as they are further close to the subject and that they can shoot an wide area even if the subject locates closer such as an indoor scene.

Zoom lenses suitable for a camera which records an image of a subject by an imaging device using a photoelectric detector have been proposed in Japanese Patent Application Laid-Open Nos. 2001-56436 and 2001-242379. The zoom lens composed of, in order from an object, a first lens group having positive refractive power, a second lens group having negative refractive power, a third lens group having positive refractive power, and a fourth lens group having positive refractive power. The zoom lens is a positive-negative-positive-positive four-lens-group type zoom lens, so called. When the state of lens group positions varies from a wide-angle end state to a telephoto end state, the first lens group and the fourth lens group are fixed and the second lens group and the third lens group are moved.

Another zoom lens has been proposed in Japanese Patent Application Laid-Open No. 2001-356269. The zoom lens is also a positive-negative-positive-positive four-lens-group type zoom lens. When the state of lens group positions varies from a wide-angle end state to a telephoto end state, the first lens group, the second lens group, and the third lens group are moved.

Another zoom lens has been proposed in Japanese Patent Application Laid-Open No. 2001-188170. The zoom lens is also a positive-negative-positive-positive four-lens-group type zoom lens. When the state of lens group positions varies from a wide-angle end state to a telephoto end state, all lens groups are moved.

Another zoom lens has been proposed in Japanese Patent Application Laid-Open No. 7-5361. The zoom lens is also a positive-negative-positive-positive four-lens-group type zoom lens. When the state of lens group positions varies from a wide-angle end state to a telephoto end state, the first lens group and the third lens group are moved to the object, the second lens group is moved to the image, and the fourth lens group is moved at first to the object and then moved to the image.

Another zoom lens as an interchangeable lens for an SLR camera has been proposed in Japanese Patent Application Laid-Open No. 57-5012. The zoom lens is also a positive-negative-positive-positive four-lens-group type zoom lens. When the state of lens group positions varies from a wide-angle end state to a telephoto end state, the first lens group and the third lens group are moved to the object, the second lens group is moved at first to the image and then moved to the object, and the fourth lens group is moved at first to the object and then moved to the image.

With progress in the high integration of the imaging device, it becomes necessary that the optical system can realize high contrast with respect to high spatial frequency. At the same time, since a light detecting area of each photoelectric converter becomes small, in order to secure sufficient light quantity to each photoelectric converter, it becomes necessary that the optical system has a large aperture ratio. As a result, it causes problems such that the number of lens elements becomes large, and the optical system becomes large.

Digital cameras, as getting popularity, are being used widely. User requirements for digital cameras to improve portability, in particular compactness and lightweight, are getting stronger. At the same time, a high zoom ratio is also required.

When an optical system is made to be high zoom ratio, it tends to become large. To make an optical system be high zoom ratio tends to against to making the optical system be compact. In particular, when an optical system is planned to be high zoom ratio as well as to be compact, the refractive power of each lens group consisting of the optical system tends to become large. Accordingly, variation in off-axis aberrations tends to produce in accordance with change in the state of lens group positions or change in the angle of view, so that it is difficult to improve the optical system to have high optical performance.

When the zoom lens disclosed in Japanese Patent Application Laid-Open No. 2001-56436 or 2001-242379 is applied to a digital camera, since the movable lens group is only two, the moving amount of each lens group has to become large, so the zoom lens system becomes large to prevent improvement in portability.

In the case of applying the zoom lens disclosed in Japanese Patent Application Laid-Open No. 2001-356269 or 2001-188170 to a digital camera, since the first lens group is at first moved to the image and then moved to the object upon varying the state of lens group positions from the wide-angle end state to the telephoto end state, off-axis rays passing through the first lens group tend to leave away from the optical axis. Accordingly, it becomes difficult to make the lens diameter be small. Moreover, when the zoom lens disclosed in Japanese Patent Application Laid-Open No. 2001-356269 is applied to a digital camera, since the third lens group is rather large, so it is difficult to improve portability. Furthermore, when the zoom lens disclosed in Japanese Patent Application Laid-Open No. 2001-188170 is applied to a digital camera, since the third lens group is composed of, in order from the object, a positive lens, and a cemented lens constructed by a positive lens cemented with a negative lens, it is difficult to correct negative spherical aberration produced in the third lens group independently, so it is difficult to satisfy both compactness and correction of the aberration.

In the zoom lens disclosed in Japanese Patent Application Laid-Open No. 7-5361, since an aperture stop is moved independently with the lens groups, an aperture moving mechanism is necessary in addition to the lens group moving mechanism, so it is not suitable for compactness and lightweight.

In the zoom lens disclosed in Japanese Patent Application Laid-Open No. 57-5012, the third lens group is too close to the fourth lens group in the wide-angle end state. Accordingly, it becomes difficult to arrange the position of the exit pupil to an appropriate position.

SUMMARY OF THE INVENTION

The present invention is made in view of the aforementioned problems and has an object to provide a variable focal length lens system having a high zoom ratio and compactness.

According to one aspect of the present invention, a variable focal length lens system includes four lens groups that are, in order from an object, a first lens group having positive refractive power, a second lens group having negative refractive power, a third lens group having positive refractive power, and a fourth lens group having positive refractive power. When the state of lens group positions varies from a wide-angle end state to a telephoto end state, at least the first lens group and the third lens group are moved to the object such that a distance between the first lens group and the second lens group increases, a distance between the second lens group and the third lens group decreases, and a distance between the third lens group and the fourth lens group increases. An aperture stop is arranged in the vicinity of the third lens group. The second lens group is composed of three lens elements that are, in order from the object, a first negative lens element having a concave surface facing to the image, a second negative lens element having a concave surface facing to the image, and a positive lens element having a convex surface facing to the object. The following conditional expression (1) is satisfied:

$$3<(R24+R25)/fw<5 \qquad (1)$$

where R24 denotes the radius of curvature of the image side surface of the second negative lens element in the second lens group, R25 denotes the radius of curvature of the object side surface of the positive lens element in the second lens group, and fw denotes the focal length of the variable focal length lens system in the wide-angle end state.

In one preferred embodiment of the present invention, the first negative lens element and the second negative lens element are arranged with an air space therebetween. The second negative lens element and the positive lens element are arranged with an air space threrebetween. The following conditional expression (2) is preferably satisfied:

$$0.7<\Sigma 2/fw<2.1 \qquad (2)$$

where $\Sigma 2$ denotes a distance along the optical axis between the most object side lens surface and the most image side lens surface in the second lens group.

In one preferred embodiment of the present invention, the first negative lens element has a meniscus shape having a concave surface facing to the image and the following conditional expression (3) is preferably satisfied:

$$0.5<R22/fw<2 \qquad (3)$$

where R22 denotes a radius of curvature to the image side surface of the first negative lens element in the second lens group.

In one preferred embodiment of the present invention, the third lens group is composed of, in order from the object, a first subgroup having positive refractive power, and a second subgroup having negative refractive power. The first subgroup and the second subgroup are arranged with an air space therebetween. The following conditional expression (4) is preferably satisfied:

$$0.02<D2/f3<0.16 \qquad (4)$$

where D2 denotes a distance along the optical axis between the first subgroup and the second subgroup in the third lens group, and f3 denotes the focal length of the third lens group.

In one preferred embodiment of the present invention, the first lens group is composed of a cemented positive lens constructed by a negative meniscus lens having a convex surface facing to the object cemented with a positive lens having a convex surface facing to the object. The following conditional expression (5) is preferably satisfied:

$$3<R11/fw<5 \qquad (5)$$

where R11 denotes a radius of curvature of the object side surface of the cemented positive lens in the first lens group.

In one preferred embodiment of the present invention, at least one of the following conditional expressions (6) and (7) is satisfied:

$$3 < f1/(fw \cdot ft)^{1/2} < 7.5 \quad (6)$$

$$0.6 < |f2|/(fw \cdot ft)^{1/2} < 1.1 \quad (7)$$

where f1 denotes the focal length of the first lens group, f2 denotes the focal length of the second lens group, and ft denotes the focal length of the variable focal length lens system in the telephoto end state.

In one preferred embodiment of the present invention, the third lens group includes, in order from the object, a first subgroup having positive refractive power located to the most object side, and a second subgroup having negative refractive power located adjacent to the first subgroup. The first subgroup and the second subgroup are located with an air space therebetween. The following conditional expression (4) is preferably satisfied:

$$0.02 < D2/f3 < 0.16 \quad (4)$$

where D2 denotes a distance along the optical axis between the first subgroup and the second subgroup in the third lens group, and f3 denotes the focal length of the third lens group.

According to another aspect of the present invention, a variable focal length lens system includes four lens groups that are, in order from an object, a first lens group having positive refractive power, a second lens group having negative refractive power, a third lens group having positive refractive power, and a fourth lens group having positive refractive power. When the state of lens group positions varies from a wide-angle end state to a telephoto end state, the first lens group is moved to the object such that a distance between the first lens group and the second lens group increases, a distance between the second lens group and the third lens group decreases, and a distance between the third lens group and the fourth lens group varies. An aperture stop is arranged adjacent to the object side of the third lens group. The third lens group is composed of three lens elements that are, in order from the object, a positive lens element, a negative lens element, and a positive lens element. The following conditional expression (8) is satisfied:

$$0.5 < Da/fw < 1.5 \quad (8)$$

where Da denotes a distance along the optical axis between the most object side lens surface and the most image side lens surface of the third lens group, and fw denotes the focal length of the variable focal length lens system in the wide-angle end state.

In one preferred embodiment of the present invention, when the state of lens group positions varies from the wide-angle end state to the telephoto end state, the first lens group and the third lens group are moved to the object such that the distance between the third lens group and the fourth lens group increases. The following conditional expression (9) is preferably satisfied:

$$1 < \Delta 1/(fw \cdot ft)1/2 < 2 \quad (9)$$

where $\Delta 1$ denotes a moving amount of the first lens group upon changing the state of lens group positions from the wide-angle end state to the telephoto end state, and ft denotes the focal length of the variable focal length lens system in the telephoto end state.

In one preferred embodiment of the present invention, the second lens group is composed of three lens elements that are, in order from the object, a first negative lens element having a concave surface facing to the image, a second negative lens element having a concave surface facing to the image, and a positive lens element having a convex surface facing to the object. The following conditional expression (10) is preferably satisfied:

$$0.03 < D23/|f2| < 0.20 \quad (10)$$

where D23 denotes a distance between the second negative lens element and the positive lens element in the second lens group, and f2 denotes the focal length of the second lens group.

In one preferred embodiment of the present invention, the first lens group is composed of a cemented positive lens constructed by a negative meniscus lens having a convex surface facing to the object cemented with a positive lens. The following conditional expression (11) is preferably satisfied:

$$D1/R1 < (fw^2/(fw^2 + y_{max}^2))^{1/2} \quad (11)$$

where D1 denotes a distance along the optical axis between the most object side lens surface of the first lens group and the aperture stop in the wide-angle end state, R1 denotes a radius of curvature of the most object side lens surface of the first lens group, and $y_{max}$ denotes the maximum image height.

According to another aspect of the present invention, a variable focal length lens system includes four lens groups that are, in order from an object, a first lens group having positive refractive power, a second lens group having negative refractive power, a third lens group having positive refractive power and a fourth lens group having positive refractive power. When the state of lens group positions varies from a wide-angle end state to a telephoto end state, at least the first lens group and the third lens group are moved to the object and the second lens group is moved at first to the image and then to the object such that a distance between the first lens group and the second lens group increases, a distance between the second lens group and the third lens group decreases, and a distance between the third lens group and the fourth lens group increases. An aperture stop is arranged in the vicinity of the third lens group and is moved with the third lens group upon changing the state of lens group positions. The following conditional expressions (12) and (13) are satisfied:

$$0.15 < \Delta 1/(Z \cdot (fw \cdot ft)^{1/2}) < 0.5 \quad (12)$$

$$0.6 < D34W/fw < 1.7 \quad (13)$$

where $\Delta 1$ denotes a moving amount of the first lens group upon changing the state of lens group positions from the wide-angle end state to the telephoto end state, fw denotes the focal length of the variable focal length lens system in the wide-angle end state, ft denotes the focal length of the variable focal length lens system in the telephoto end state, Z denotes the zoom ratio (ft/fw), and D34W denotes a distance along the optical axis between the third lens group and the fourth lens group in the wide-angle end state.

In one preferred embodiment of the present invention, the following conditional expression (14) is preferably satisfied:

$$0.7 < D23W/\Delta 3 \quad (14)$$

where D23W denotes a distance between the second lens group and the third lens group in the wide-angle end state, and $\Delta 3$ denotes a moving amount of the third lens group upon changing the state of lens group positions from the wide-angle end state to the telephoto end state.

In one preferred embodiment of the present invention, the aperture stop is arranged in the vicinity of the object side of the third lens group and the following conditional expression (15) is preferably satisfied:

$$0.7 < \Sigma 3/fw < 1.5 \qquad (15)$$

where Σ3 denotes a distance along the optical axis between the aperture stop and the most image side lens surface of the third lens group.

In one preferred embodiment of the present invention, the second lens group includes a negative lens element locating to the most object side and at least one positive lens element located to the image side of the negative lens element. The following conditional expression (16) is preferably satisfied:

$$0.8 < \Sigma 2/fw < 1.8 \qquad (16)$$

where Σ2 denotes a distance along the optical axis between the most object side lens surface and the most image side lens surface of the second lens group.

In one preferred embodiment of the present invention, the second lens group is composed of three lens elements that are, in order from the object, a negative lens element having a concave surface facing to the image, a negative lens element having a concave surface facing to the image, and a positive lens element having a convex surface facing to the object. Each lens element is separated with each other with an air space. The following conditional expression (17) is preferably satisfied:

$$1 < f2P/|f2| < 2 \qquad (17)$$

where f2P denotes the focal length of the positive lens element in the second lens group, and f2 denotes the focal length of the second lens group.

In one preferred embodiment of the present invention, the third lens group includes, in order from the object, a positive lens element having a convex surface facing to the object, and a negative lens element having a concave surface facing to the object. The following conditional expression (18) is preferably satisfied:

$$0.6 < |f3N|/f3 < 1.4 \qquad (18)$$

where f3N denotes the focal length of the negative lens element in the third lens group and f3 denotes the focal length of the third lens group.

Other features and advantages according to the invention will be readily understood from the detailed description of the preferred embodiment in conjunction with the accompanying drawings.

BRIEF DESCRIPTION OF THE DRAWINGS

FIG. 4 is a diagram showing the lens arrangement of a variable focal length lens system according to Examples 2, 6, and 10 of the present invention.

DESCRIPTION OF THE PREFERRED EMBODIMENTS

First Embodiment

Figure 1:
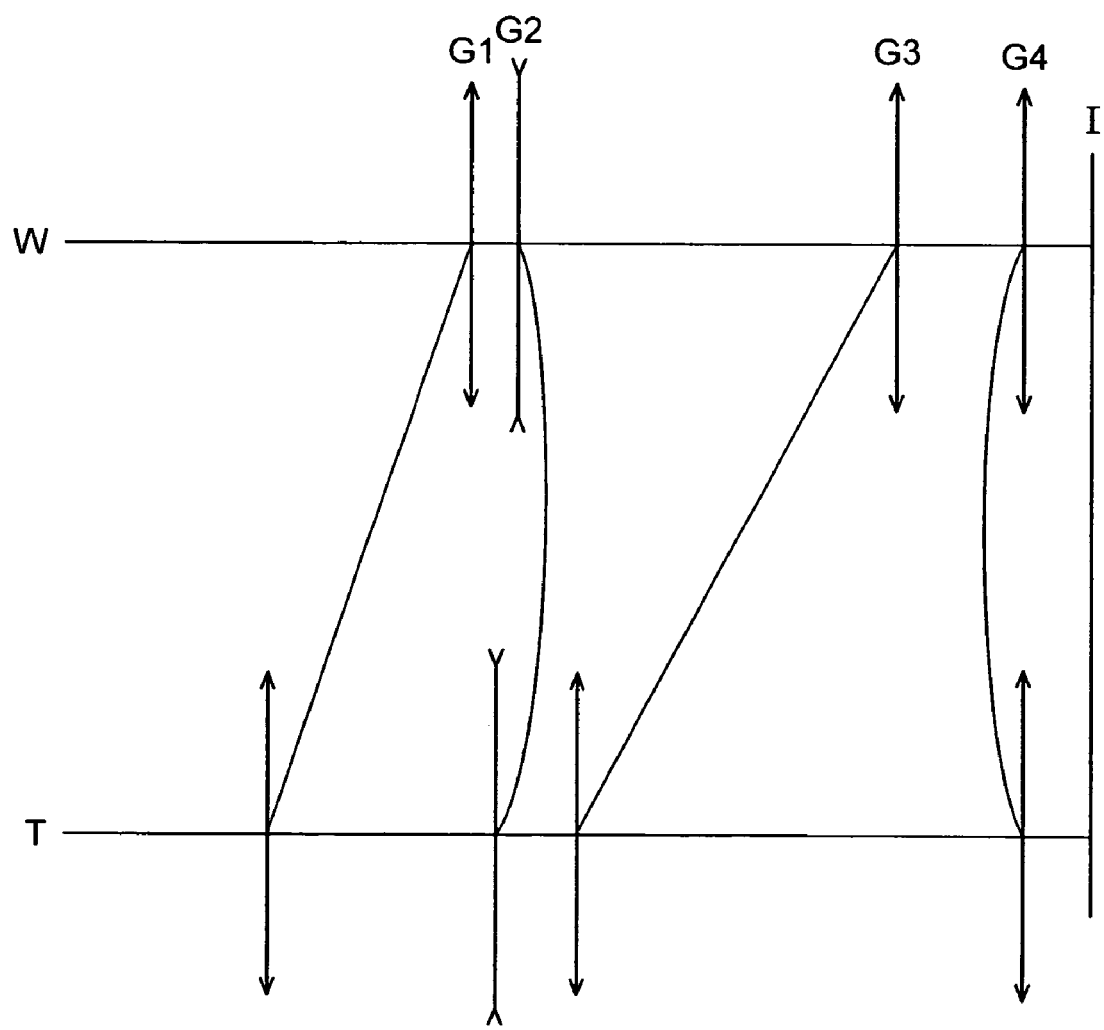
FIG. 1 is a diagram showing the power arrangement of a variable focal length lens system according to each Example of the present invention together with the movement of each lens group upon zooming.

A variable focal length lens system according to a first embodiment of the present invention is composed of four lens groups which are, in order from an object, a first lens group having positive refractive power, a second lens group having negative refractive power, a third lens group having positive refractive power, and a fourth lens group having positive refractive power. An aperture stop is arranged in the vicinity of the third lens group. When the state of lens group positions varies from a wide-angle end state where the focal length of the lens system becomes shortest to a telephoto end state where the focal length of the lens system becomes longest, at least the first lens group and the third lens group move to the object such that a distance between the first lens group and the second lens group increases, a distance between the second lens group and the third lens group decreases, and a distance between the third lens group and the fourth lens group increases.

Generally, in a zoom lens system having a plurality of lens groups, since the number of moveable lens groups upon changing the state of lens group positions increases, variation in off-axis aberrations produced upon changing the state of lens group positions can be corrected satisfactory. Accordingly, the zoom ratio which is the value of the focal length of the lens system in the telephoto end state divided by that in the wide-angle end state can be increased.

In order to correct satisfactory variation in off-axis aberrations produced upon changing the state of lens group positions in particular, it is important to move each lens group actively. For that purpose, by increasing the moving amount of each lens group, the height of off-axis rays passing through each lens group can be varied actively and variation in off-axis aberrations can be corrected satisfactory. Moreover, by arranging at least one moveable lens group to both image side and object side of the aperture stop ray aberrations upper than the principal ray and ray aberrations lower than the principal ray can be corrected satisfactory.

In the variable focal length lens system according to the first embodiment of the present invention, off-axis rays pass through the second lens group away from the optical axis in the wide-angle end state. Upon changing the state of lens group positions toward the telephoto end state, the off-axis rays gradually approach the optical axis. Accordingly, off-axis aberrations produced in the wide-angle end state can be corrected satisfactory. On the other hand, since off-axis rays pass through the fourth lens group farther away from the optical axis in the telephoto end state than in the wide-angle end state, off-axis aberrations produced in the telephoto end state can be corrected well.

Furthermore, by moving the first lens group to the object upon changing the state of lens group positions from the wide-angle end state to the telephoto end state, off-axis rays passing through the first lens group do not leave away from the optical axis in the wide-angle end state, and on-axis rays passing through the first lens group converge strongly in the telephoto end state. By constructing in this way, the lens diameter of the first lens group can be small and the total lens length of the lens system in the telephoto end state can be short. Accordingly, the lens system can be compact, so that portability can be improved.

The second lens group of the variable focal length lens system according to the first embodiment of the present invention is the only negative lens group and has large refractive power. When the state of lens group positions changes from the wide-angle end state to the telephoto end state, off-axis rays passing through the second lens group vary largely. Accordingly, it is indispensable to correct various aberrations produced in the second lens group satisfactory.

Accordingly, the second lens group of the variable focal length lens system according to the first embodiment of the present invention is composed of three lens elements which are, in order from the object, a first negative lens element, a second negative lens element, and a positive lens element, so the aberration correction function is clearly separated to each element. By this arrangement variation in off-axis aberrations produced upon changing the state of lens group positions can be corrected satisfactory.

For more information, the aberration correction function is separated such that the first negative lens element corrects off-axis aberrations, and the second negative lens element and the positive lens element correct on-axis aberrations. Since the first negative lens element arranged away from the aperture stop, off-axis rays pass away from the optical axis in the wide-angle end state. Accordingly, the first negative lens element is suitable for correcting off-axis aberrations. The second negative lens element and the positive lens element, which form a doublet, are suitable for correcting mainly on-axis aberrations.

The aperture stop is arranged to the image side of the second lens group. Production of off-axis aberrations can be suppressed by arranging such that the image side surface of the second negative lens element of the second lens group is a concave surface, in other words, the second negative lens element has a concave surface facing to the aperture stop, and the object: side surface of the positive lens element facing to the image side surface of the second negative lens element is a convex surface facing to the object, in other words, the object side surface of the positive lens element is a concave surface facing to the aperture stop.

By using the construction described above, the variable focal length lens system according to the first embodiment of the present invention makes it possible to realize improvement of optical performance, compactness, and a high zoom ratio. Accordingly, with the improvement of integration of an imaging device and portability of a camera, compactness and improvement of optical performance required to a variable focal length lens system can be satisfied.

Conditional expressions of a variable focal length lens system according to the first embodiment of the present invention are explained below.

A variable focal length lens system according to the first embodiment of the present invention satisfies the following conditional expression (1):

$$3<(R24+R25)/fw<5 \qquad (1)$$

where R24 denotes a radius of curvature of the image side surface of the second negative lens element of the second lens group, R25 denotes a radius of curvature of the object side surface of the positive lens element of the second lens-group, and fw denotes the focal length of the variable focal length lens system in the wide-angle end state.

Conditional expression (1) defines an appropriate range of the shapes of the second negative lens element and the positive lens element in the second lens group.

When the ratio (R24+R25)/fw is equal to or falls blow the lower limit of conditional expression (1), optical performance is extremely deteriorated by even minute decentering between the second negative lens element and the positive lens element produced upon manufacturing, so it becomes difficult to maintain given optical performance stably. On the other hand, when the ratio is equal to or exceeds the upper limit of conditional expression (1), positive on-axis aberration produced in the second negative lens element and the positive lens element cannot be corrected satisfactory. Accordingly, the aberration correction function in the second lens group does not work sufficiently, so variation in off-axis aberrations produced upon changing the state of lens group positions cannot be corrected satisfactory.

In the variable focal length lens system according to the first embodiment of the present invention, in order to realize better optical performance, the first negative lens element, the second negative lens element, and the positive lens element, which the second lens group consists of, are separated each other with air spaces, and the following conditional expression (2) is preferably satisfied:

$$0.7<\Sigma2/fw<2.1 \qquad (2)$$

where Σ2 denotes a distance along the optical axis between the most object side lens surface and the most image side lens surface of the second lens group.

Conditional expression (2) defines an appropriate range of the lens thickness of the second lens group.

When the ratio Σ2/fw is equal to or exceeds the upper limit of conditional expression (2), the thickness of the second lens group becomes large. Accordingly, off-axis ray passing through the first lens group and the first negative lens element of the second lens group passes extremely away from the optical axis, so that the lens diameter becomes large. Moreover, since the light ray passes on the periphery of the lens, coma is produced largely, so it becomes difficult to realize given optical performance. On the other hand, when the ratio is equal to or falls below the lower limit of conditional expression (2), the thickness of the second lens group becomes small. Accordingly, the distance between each lens element becomes small, and refractive power of each lens element becomes large. Therefore, in order to suppress high order positive spherical aberration produced in the second negative lens element and the positive lens element in particular and to prevent interference between the first negative lens element and the second negative lens element, off-axis ray should be near to the optical axis. As a result, variation in coma upon changing the angle of view cannot be corrected.

In the variable focal length lens system according to the first embodiment of the present invention, in order to preferably correct coma in particular produced on the periphery of the image frame in the wide-angle end state to realize high optical performance, the shape of the first negative lens element in the second lens group is a meniscus having a concave surface facing to the image, and the following conditional expression (3) is preferably satisfied:

$$0.5<R22/fw<2 \qquad (3)$$

where R22 denotes a radius of curvature of the image side surface of the first negative lens element in the second lens group.

In the wide-angle end state, incident angle of a ray incident to the second lens group becomes large. Accordingly, when the object side surface of the first negative lens element is a concave surface facing to the object, coma is excessively produced on the periphery of the image frame. As described above, the image side surface of the first negative lens element is preferably a concave surface facing to the image, so when the first negative lens element has a negative meniscus shape having a concave surface facing to-the image, high optical performance can be realized. When the first negative lens element has a meniscus shape, the radius of curvature of the image side surface becomes small. Therefore, the image side surface produces high order curvature of field in the wide-angle end state, so it is preferable to satisfy conditional expression (3). When the ratio R22/fw is equal to or exceeds the upper limit of conditional expression (3), coma produces excessively on the periphery of the image frame by the effect of the image side surface of the first negative lens element. On the other hand, when the ratio is equal to or falls below the lower limit of conditional expression (3), high order curvature of field is produced on the image side surface of the first negative lens element in the wide-angle end state.

In the variable focal length lens system according to the first embodiment of the present invention, the third lens group is composed of, in order from the object, a first subgroup having positive refractive power and a second subgroup having negative refractive power. The first subgroup and the second subgroup are separated with an air space. Accordingly, the power arrangement of the whole lens system approaches a symmetric type, so negative distortion can be corrected satisfactory. In the variable focal length lens system according to the first embodiment of the present invention in particular, in order to realize to shorten the total lens length and high optical performance, the following conditional expression (4) is preferably satisfied:

$$0.02<D2/f3<0.16 \qquad (4)$$

where D2 denotes the distance along the optical axis between the first subgroup and the second subgroup in the third lens group, and f3 denotes the focal length of the third lens group.

Conditional expression (4) defines an appropriate range of the distance along the optical axis between the first subgroup and the second subgroup in the third lens group.

When the ratio D2/f3 is equal to or falls below the lower limit of conditional expression (4), refractive power of the first subgroup becomes large in the positive direction. Accordingly, negative spherical aberration produced independently in the third lens group cannot be corrected well. On the other hand, when the ratio is equal to or exceeds the upper limit of conditional expression (4), the total lens length of the lens system becomes large, so it spoils improvement of portability.

In the variable focal length lens system according to the first embodiment of the present invention, in order to shorten the total lens length in the telephoto end state and to improve optical performance on the periphery of the image frame in the wide-angle end state, the first lens group is composed of a cemented positive lens constructed by a negative meniscus lens having a convex surface facing to the object cemented with a positive lens having a convex surface facing to the object, and the following conditional expression (5) is preferably satisfied:

$$3<R11/fw<5 \qquad (5)$$

where R11 denotes the radius of curvature of the object side surface of the cemented positive lens in the first lens group.

Conditional expression (5) defines an appropriate range of the radius of curvature of the object side surface of the cemented positive lens in the first lens group.

When the ratio R11/fw is equal to or exceeds the upper limit of conditional expression (5), negative spherical aberration produced in the first lens group in the telephoto end state cannot be corrected satisfactory. On the other hand, when the ratio is equal to or falls below the lower limit of conditional expression (5), the rim thickness of the cemented positive lens cannot be secured sufficiently, so the lens thickness has to be large. Accordingly, off-axis ray passes excessively away from the optical axis, so coma cannot be corrected sufficiently on the periphery of the image frame.

In the variable focal length lens system according to the first embodiment of the present invention, in order to preferably correct variation in off-axis aberration produced upon changing the state of lens group positions, to improve compactness of the lens system, and to improve optical performance and portability, at least one of the following two conditional expressions (6) and (7) is preferably satisfied:

$$3 < f1/(fw \cdot ft)^{1/2} < 7.5 \quad (6)$$

$$0.6 < |f2|/(fw \cdot ft)^{1/2} < 1.1 \quad (7)$$

where f1 denotes the focal length of the first lens group, and f2 denotes the focal length of the second lens group, and ft denotes the focal length of the variable focal length lens system in the telephoto end state.

Conditional expression (6) defines an appropriate range of the focal length of the first lens group.

When the ratio $f1/(fw \cdot ft)^{1/2}$ is equal to or exceeds the upper limit of conditional expression (6) the total lens length in the telephoto end state becomes large, so it becomes difficult to realize sufficient improvement of portability. On the other hand, when the ratio is equal to or falls below the lower limit of conditional expression (6), off-axis ray passing through the first lens group in the wide-angle end state refracts strongly. Accordingly, variation in coma produced upon changing the angle of view cannot be corrected well, so that it becomes difficult to realize higher optical performance.

Conditional expression (7) defines an appropriate range of the focal length of the second lens group.

When the ratio $|f2|/(fw \cdot ft)^{1/2}$ is equal to or exceeds the upper limit of conditional expression (7), the distance between the second lens group and the third lens group in the wide-angle end state has to be larger. Accordingly, off-axis ray passing through the second lens group passes away from the optical axis, so that variation in coma produced upon changing the angle of view cannot be corrected satisfactory. On the other hand, when the ratio is equal to or falls below the lower limit of conditional expression (7), positive spherical aberration independently produced in the second lens group cannot be corrected satisfactory. Accordingly, it is impossible to realize higher optical performance in the telephoto end state.

In the variable focal length lens system according to the first embodiment of the present invention, higher optical performance can be realized by applying an aspherical lens. In particular, by applying an aspherical lens to the first negative lens element of the second lens group off-axis aberrations produced in the wide-angle end state can be corrected well. Moreover, by applying an aspherical lens in the third lens group coma produced on the periphery of the image frame in the wide-angle end state can be corrected satisfactory. Higher optical performance can be realized by applying a plurality of aspherical surfaces at the same time.

In the variable focal length lens system according to the first embodiment of the present invention, in order to realize compactness, the number of lens elements is made to be as smaller as possible. However, higher optical performance can be realized by constructing, for example, at least one lens element of the three lens elements of which the third lens group consists by a cemented lens. Higher optical performance can be realized by constructing at least one lens element of the lens elements of which the second lens group consists by a cemented lens.

In the variable focal length lens system according to the first embodiment of the present invention, by shifting a lens group consisting of the lens system or a portion of the lens group substantially perpendicularly to the optical axis image can be shifted. Accordingly, the variable focal length lens system according to the first embodiment of the present invention can be used as a vibration reduction optical system in combination with a vibration detector for detecting vibration of a camera, a driver for shifting above-described one lens group or a portion of the lens group, and a controller for controlling the driver to correct the vibration detected by the vibration detector.

In the variable focal length lens system according to the first embodiment of the present invention, it is suitable for suppressing variation in various aberrations to move the second lens group to the fourth lens group upon focusing a close object. In particular, in the following Examples, although the fourth lens group is composed of a positive lens element, in order to correct variation in off-axis aberrations produced upon focusing close object, the fourth lens group may be constructed by a cemented lens.

In the variable focal length lens system according to the first embodiment of the present invention, in order to prevent production of moiré pattern to the image side of the lens system, a low-pass filter or an infrared-cut filter in accordance with the frequency characteristic of the detector may be arranged.

The variable focal length lens system according to the first embodiment of the present invention can be applied to a so-called varifocal lens whose state of focal length does not exist continuously.

Each Example of the variable focal length lens system according to the first embodiment of the present invention is explained below with reference to accompanying drawings.

In each Example, an aspherical surface is expressed by the following expression:

$$x = cy^2/[1+(1-\kappa \cdot c^2 y^2)^{1/2}] + C_4 y^4 + C_6 y^6 + C_8 y^8 + C_{10} y^{10}$$

where y denotes the height from the optical axis, x denotes sag amount, c denotes reference radius of curvature (paraxial radius of curvature), κ denotes the conical coefficient, and $C_4$, $C_6$, $C_8$, $C_{10}$ denote 4th, 6th, 8th, and 10th order aspherical surface coefficient, respectively.

FIG. 1 is a diagram showing the power arrangement of a variable focal length lens system according to each Example of the present invention, in which W denotes a wide-angle end state and T denotes a telephoto end state.

The variable focal length lens system according to each Example of the first embodiment of the present invention is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from the wide-angle end state to the telephoto end state, the first lens group G1 and the third lens group G3 are moved to the object such that a distance between the first lens group G1 and the second lens group G2 increases, a distance between the second lens group G2 and the third lens group G3 decreases, and a distance between the third lens group G3 and the fourth lens group G4 increases. At this time, the second lens group G2 is moved to the object or at first moved to the image and then moved to the object. The fourth lens group G4 is fixed or at first moved to the object and then moved to the image.

EXAMPLE 1

Figure 2:
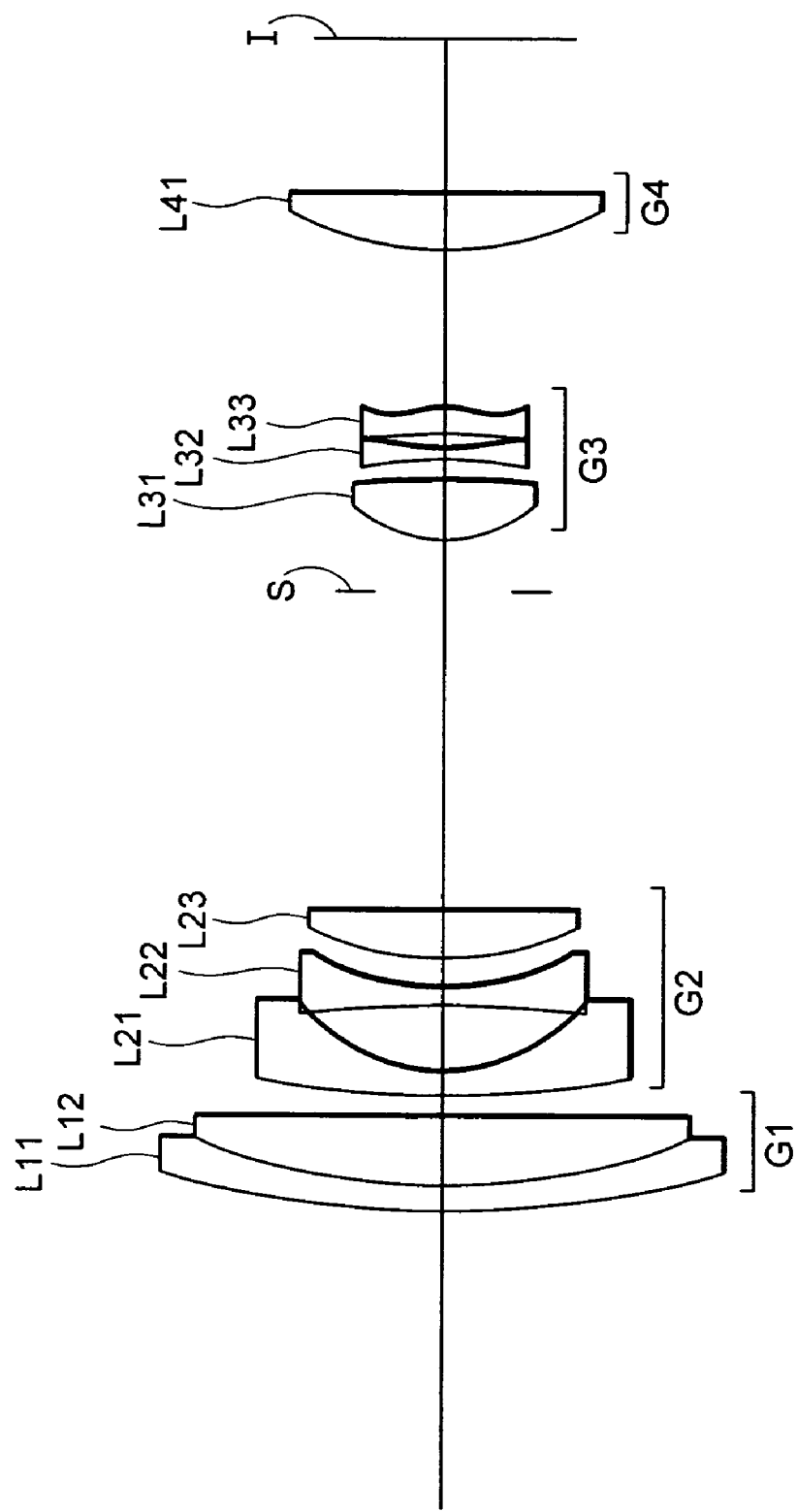
FIG. 2 is a diagram showing the lens arrangement of a variable focal length lens system according to Examples 1, 5, and 9 of the present invention.

FIG. 2 is a diagram showing the lens arrangement of a variable focal length lens system according to Example 1 of the first embodiment of the present invention.

In the variable focal length lens system according to Example 1, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image. A first subgroup having positive refractive power is composed of the positive lens element L31. A second subgroup having negative refractive power is composed of a combination of the negative lens element L32 and the positive lens element L33. By the way, the second subgroup may be composed only of the negative lens element L32.

The fourth lens group G4 is composed of a positive lens element L41 having a convex surface facing to the object.

In the variable focal length lens system according to Example 1, an aperture stop S is arranged to the object side of the third lens group G3 and is moved together with the third lens group G3 when the state of lens group positions varies.

Various values associated with Example 1 are listed in Table 1.

In the [Specifications], f denotes the focal length, FNO denotes the f-number, and 2ω denotes the maximum value of an angle of view (unit: degree).

In [Lens Data], the first column is a surface number counted in order from the object side, the second column "r" is a radius of curvature of a lens surface, the third column "d" is a distance between adjacent lens surfaces, the fourth column "n" is refractive index at d-line ($\lambda$=587.6 nm), and the fifth column "v" is Abbe number. When a radius of curvature is 0.0000, it means a plane. Bf denotes a back focal length.

In the tables for various values, "mm" is generally used for the unit of length such as the focal length, a radius of curvature, a distance between the adjacent surfaces. However, since an optical system proportionally enlarged or reduced its dimension can be obtained similar optical performance, the unit is not necessary to be limited to "mm" and any other suitable unit can be used.

By the way, in all Examples listed below, the same reference symbols as this Example are used.

TABLE 1

[Specifications]

|  | Wide-angle end | Intermediate | Telephoto end |
|---|---|---|---|
| f = | 6.39 | 14.40 | 27.16 |
| FNO = | 2.88 | 4.07 | 4.57 |
| 2ω = | 75.21° | 35.49° | 19.12° |

[Lens Data]

| | r | d | n | v |
|---|---|---|---|---|
| 1 | 40.2543 | 0.900 | 1.84666 | 23.78 |
| 2 | 26.0490 | 2.800 | 1.75500 | 52.32 |

TABLE 1-continued

[Specifications]

| | | | | |
|---|---|---|---|---|
| 3 | −1909.4996 | (D3) | 1.0 | |
| 4 | 37.9055 | 1.000 | 1.79450 | 45.40 |
| 5 | 7.0398 | 2.450 | 1.0 | |
| 6 | −61.1984 | 0.700 | 1.77250 | 49.61 |
| 7 | 10.3694 | 1.200 | 1.0 | |
| 8 | 11.9637 | 1.800 | 1.84666 | 23.78 |
| 9 | 134.7168 | (D9) | 1.0 | |
| 10 | 0.0000 | 2.000 | 1.0 | Aperture Stop S |
| 11 | 5.3928 | 2.250 | 1.72916 | 54.66 |
| 12 | −42.5477 | 0.800 | 1.0 | |
| 13 | −16.5589 | 0.650 | 1.80809 | 22.76 |
| 14 | 13.3606 | 0.450 | 1.0 | |
| 15 | −12.4508 | 0.900 | 1.79450 | 45.40 |
| 16 | −11.0987 | (D16) | 1.0 | |
| 17 | 12.3487 | 2.300 | 1.49700 | 81.61 |
| 18 | −9944.9996 | (Bf) | 1.0 | |

[Aspherical Surface Data]
Surface Number=5
$\kappa$=−2.5765
$C_4$=+1.1581×10$^{-3}$
$C_6$=−9.5500×10$^{-6}$
$C_8$=+2.2307×10$^{-8}$
$C_{10}$=+4.0283×10$^{-9}$
Surface Number=15
$\kappa$=8.1170
$C_4$+7.3841×10$^{-4}$
$C_6$=+3.9143×10$^{-4}$
$C_8$=−1.0685×10$^{-5}$
$C_{10}$=−3.0515×10$^{-8}$
Surface Number=16
$\kappa$=−9.0000
$C_4$+7.9978×10$^{-4}$
$C_6$=+4.2205×10$^{-4}$
$C_8$=−1.0964×10$^{-5}$
$C_{10}$=+1.0713×10$^{-6}$

[Variable Distance Data]

| | Wide-angle end | Intermediate | Telephoto end |
|---|---|---|---|
| f | 6.3854 | 14.3998 | 27.1599 |
| D3 | 0.7000 | 10.3807 | 17.4976 |
| D9 | 12.6680 | 3.6276 | 0.5852 |
| D16 | 6.2413 | 11.1178 | 21.0512 |
| BF | 6.0304 | 7.7015 | 6.0299 |

[Values for Conditional Expressions]
f1=55.771
f2=−9.656
f3=12.742
(1) (R24+R25)/fw=3.50
(2) Σ2/fw=1.12
(3) R22/fw=1.10
(4) D2/f3=0.06
(5) R11/fw=4.08
(6) f1/(fw·ft)$^{1/2}$=4.23
(7) |f2|/(fw·ft)$^{1/2}$=0.73

Figure 3A:
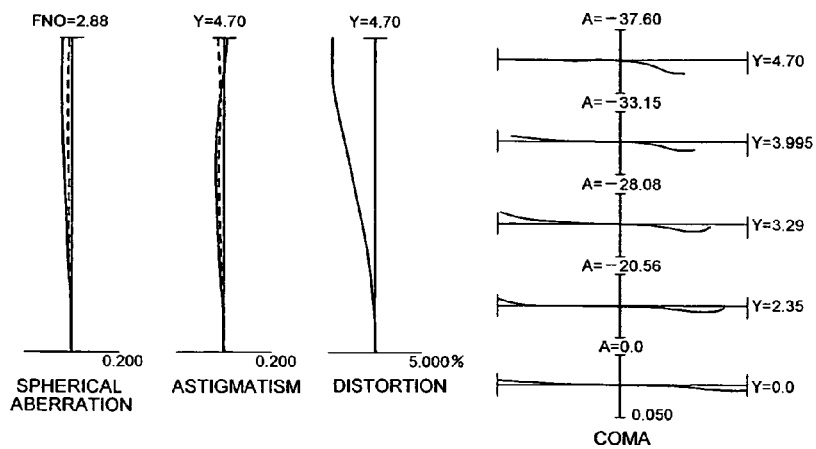
FIG. 3A graphically shows various aberrations of the variable focal length lens system according to Examples 1, 5, and 9 of the present invention in a wide-angle end state when the system is focused at infinity.
Figure 3B:
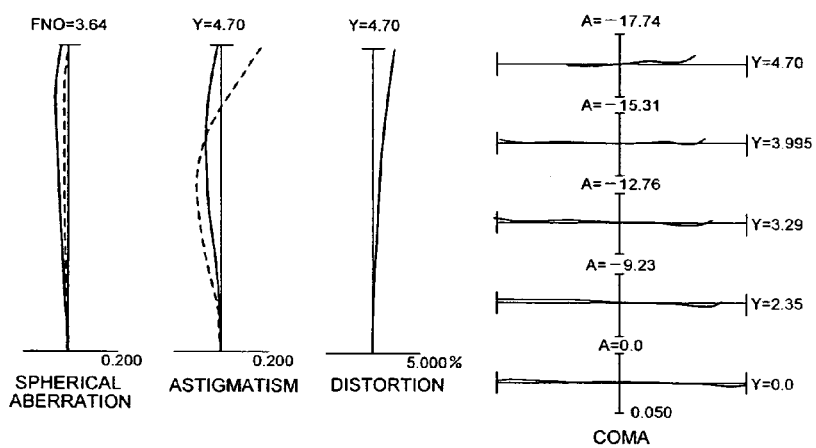
FIG. 3B graphically shows various aberrations of the variable focal length lens system according to Examples 1, 5, and 9 of the present invention in a middle focal length state when the system is focused at infinity.
Figure 3C:
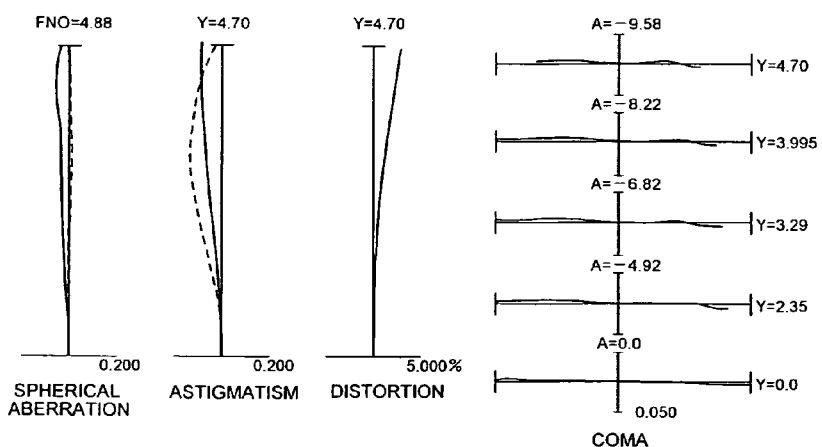
FIG. 3C graphically shows various aberrations of the variable focal length lens system according to Examples 1, 5, and 9 of the present invention in a telephoto end state when the system is focused at infinity.

FIGS. 3A, 3B, and 3C graphically show various aberrations of the variable focal length lens system according to Example 1 of the first embodiment of the present invention in a wide-angle end state (f=6.39), an intermediate focal length state (f=14.40), and a telephoto end state (f=27.16), respectively when the system is focused at infinity.

In graphs for various aberrations, FNO denotes the f-number, A denotes a half angle of view. Y denotes an image height. In the diagrams showing astigmatism and distortion, Y denotes the maximum image height.

In the diagrams showing spherical aberration, FNO denotes f-number with respect to the maximum aperture, a solid line indicates spherical aberration, and a broken line indicates sine condition.

In the diagrams showing astigmatism, a solid line indicates a sagittal image plane and a broken line indicates a meridional image plane.

In the diagrams showing coma, coma is shown at each image height Y=0.0, 2.35, 3.29, 3.995, and 4.70.

In graphs for various aberrations in the following Examples, the same reference symbols as this Example are used.

As is apparent from the respective graphs, the variable focal length lens system according to Example 1 shows superb optical performance as a result of good corrections to various aberrations.

EXAMPLE 2

FIG. 4 is a diagram showing the lens arrangement of a variable focal length lens system according to Example 2 of the first embodiment of the present invention.

In the variable focal length lens system according to Example 2, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image. A first subgroup having positive refractive power is composed of the positive lens element L31. A second subgroup having negative refractive power is composed of a combination of the negative lens element L32 and the positive lens element L33. By the way, the second subgroup may be composed only of the negative lens element L32.

The fourth lens group G4 is composed of a positive lens element L41 having a convex surface facing to the object.

In the variable focal length lens system according to Example 2, an aperture stop S is arranged to the object side of the third lens group G3 and is moved together with the third lens group G3 when the state of lens group positions varies.

Various values associated with Example 2 are listed in Table 2.

TABLE 2

[Specifications]

| | Wide-angle end | Intermediate | Telephoto end |
|---|---|---|---|
| f = | 6.70 | 14.60 | 27.13 |
| FNO = | 2.88 | 3.84 | 4.78 |
| 2ω = | 72.72° | 35.08° | 19.27° |

TABLE 2-continued

[Specifications]

[Lens Data]

| | r | d | n | ν |
|---|---|---|---|---|
| 1 | 38.2542 | 0.900 | 1.84666 | 23.78 |
| 2 | 26.4710 | 2.500 | 1.77250 | 49.61 |
| 3 | 155.9562 | (D3) | 1.0 | |
| 4 | 36.3311 | 1.000 | 1.79450 | 45.40 |
| 5 | 7.7749 | 2.650 | 1.0 | |
| 6 | −76.4394 | 0.700 | 1.75500 | 52.32 |
| 7 | 12.5365 | 1.650 | 1.0 | |
| 8 | 14.2461 | 1.800 | 1.84666 | 23.78 |
| 9 | 101.9364 | (D9) | 1.0 | |
| 10 | 0.0000 | 1.700 | 1.0 | Aperture Stop S |
| 11 | 5.9506 | 2.150 | 1.72916 | 54.66 |
| 12 | −121.3146 | 1.000 | 1.0 | |
| 13 | −25.5408 | 0.650 | 1.80809 | 22.76 |
| 14 | 11.8809 | 0.500 | 1.0 | |
| 15 | −19.0549 | 0.900 | 1.69350 | 53.22 |
| 16 | −11.2921 | (D16) | 1.0 | |
| 17 | 23.5288 | 1.350 | 1.75500 | 52.32 |
| 18 | 0.0000 | (Bf) | 1.0 | |

[Aspherical Surface Data]
Surface Number=5
$\kappa = -3.3630$
$C_4 = +1.0617 \times 10^{-3}$
$C_6 = -1.6626 \times 10^{-5}$
$C_8 = +3.2651 \times 10^{-7}$
$C_{10} = -2.2032 \times 10^{-9}$
Surface Number=15
$\kappa = 1.0000$
$C_4 = -3.1648 \times 10^{-4}$
$C_6 = +1.0222 \times 10^{-4}$
$C_8 = +1.7755 \times 10^{-5}$
$C_{10} = -9.2894 \times 10^{-7}$
Surface Number=16
$\kappa = -1.4398$
$C_4 = +5.8112 \times 10^{-4}$
$C_6 = +1.2537 \times 10^{-4}$
$C_8 = +1.3154 \times 10^{-5}$
$C_{10} = -1.7033 \times 10^{-7}$

[Variable Distance Data]

| | Wide-angle end | Intermediate | Telephoto end |
|---|---|---|---|
| f | 6.6999 | 14.5999 | 27.1315 |
| D3 | 0.7000 | 11.3350 | 21.4250 |
| D9 | 16.0590 | 5.7222 | 0.9432 |
| D16 | 8.0203 | 14.0854 | 20.0819 |
| BF | 6.0303 | 6.0303 | 6.0300 |

Figure 5A:
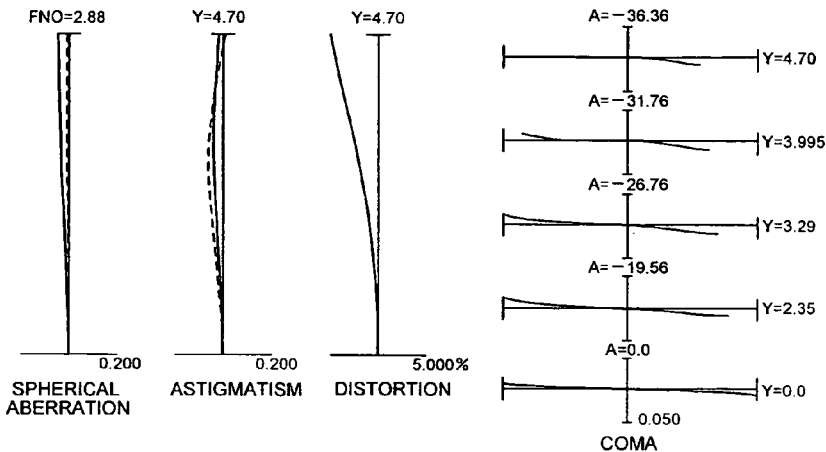
FIG. 5A graphically shows various aberrations of the variable focal length lens system according to Examples 2, 6, and 10 of the present invention in the wide-angle end state when the system is focused at infinity.
Figure 5B:
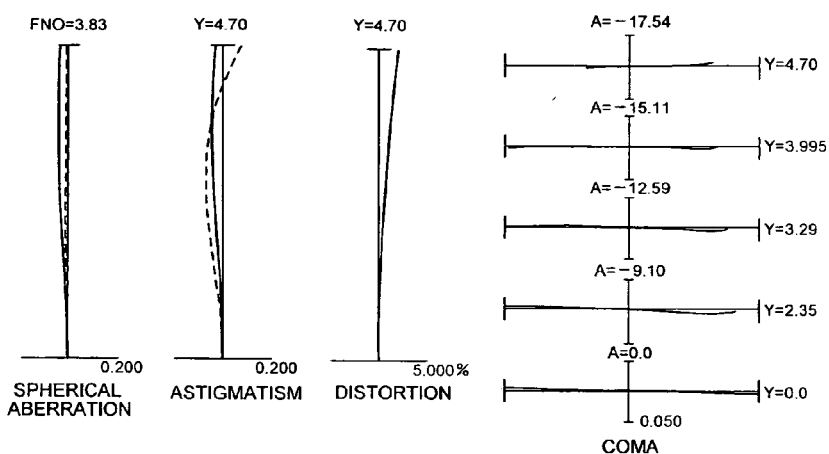
FIG. 5B graphically shows various aberrations of the variable focal length lens system according to Examples 2, 6, and 10 of the present invention in the middle focal length state when the system is focused at infinity.
Figure 5C:
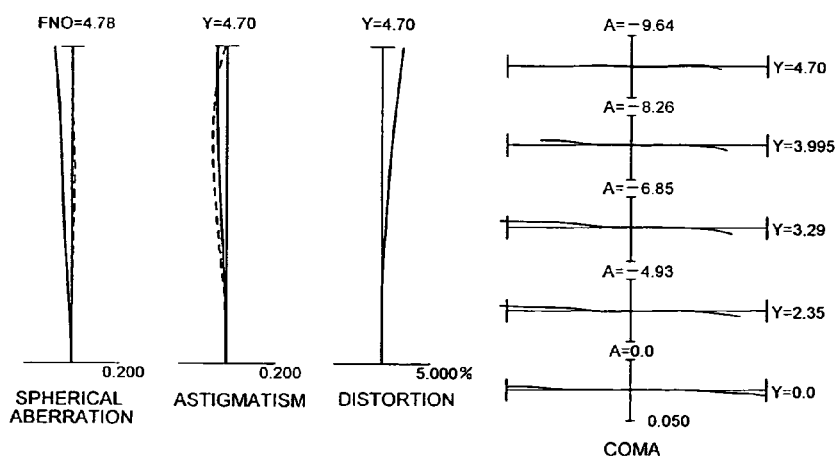
FIG. 5C graphically shows various aberrations of the variable focal length lens system according to Examples 2, 6, and 10 of the present invention in the telephoto end state when the system is focused at infinity.

[Values for Conditional Expressions]
f1=68.509
f2=−11.261
f3=13.601
(1) (R24+R25)/fw=4.00
(2) Σ2/fw=1.16
(3) R22/fw=1.16
(4) D2/f3=0.07
(5) R11/fw=3.95
(6) $f1/(fw \cdot ft)^{1/2} = 5.08$
(7) $|f2|/(fw \cdot ft)^{1/2} = 0.84$ FIGS. 5A, 5B, and 5C graphically show various aberrations of the variable focal length lens system according to Examples 2 of the present invention in a wide-angle end state (f=6.70), an intermediate focal length state (f=14.60), and a telephoto end state (f=27.13), respectively when the system is focused at infinity.

As is apparent from the respective graphs, the variable focal length lens system according to Example 2 shows superb optical performance as a result of good corrections to various aberrations.

EXAMPLE 3

Figure 6:
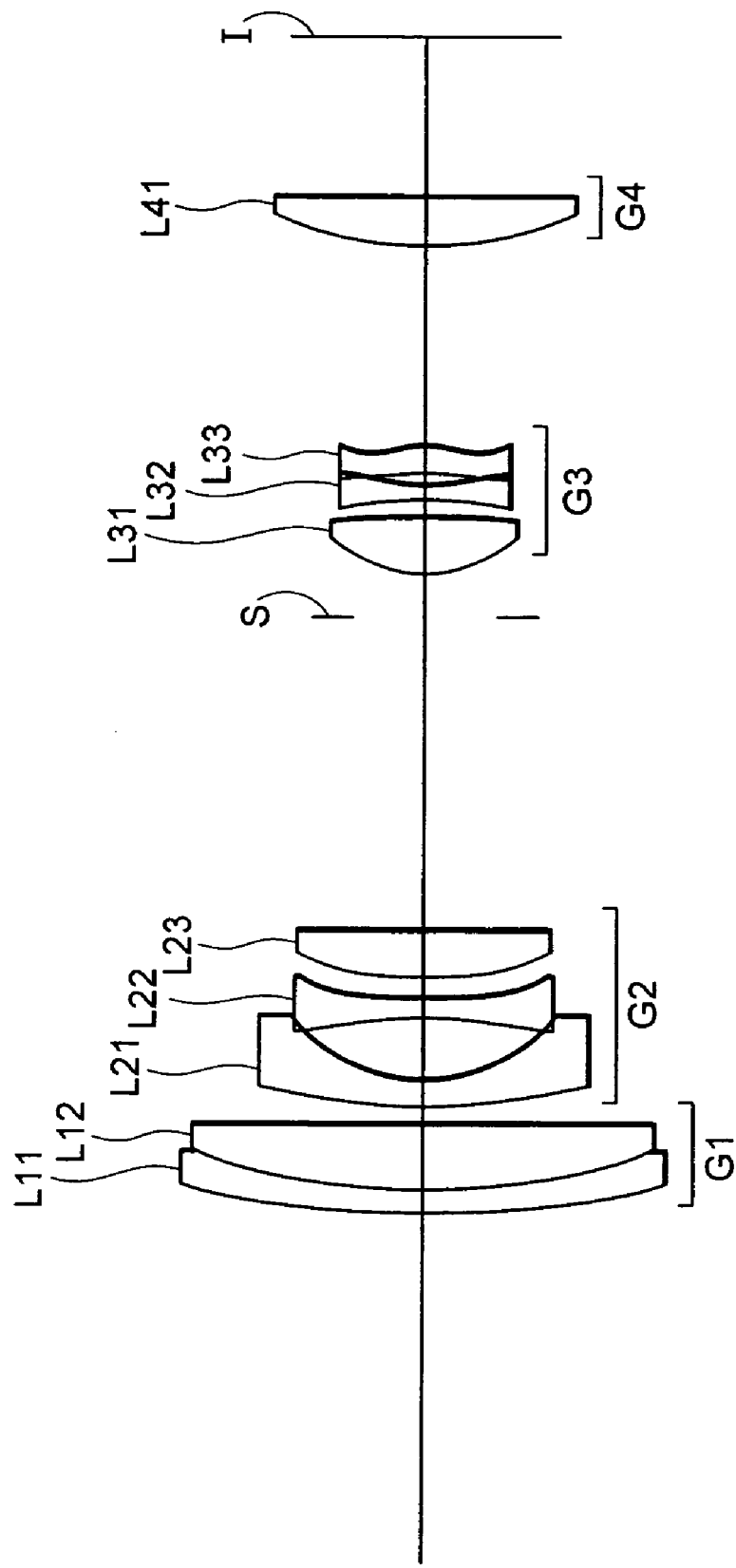
FIG. 6 is a diagram showing the lens arrangement of a variable focal length lens system according to Examples 3, 7, and 11 of the present invention.

FIG. 6 is a diagram showing the lens arrangement of a variable focal length lens system according to Example 3 of the first embodiment of the present invention.

In the variable focal length lens system according to Example 3, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image. A first subgroup having positive refractive power is composed of the positive lens element L31. A second subgroup having negative refractive power is composed of a combination of the negative lens element L32 and the positive lens element L33. By the way, the second subgroup may be composed only of the negative lens element L32.

The fourth lens group G4 is composed of a positive lens element L41 having a convex surface facing to the object.

In the variable focal length lens system according to Example 3, an aperture stop S is arranged to the object side of the third lens group G3 and is moved together with the third lens group G3 when the state of lens group positions varies. Various values associated with Example 3 are listed in Table 3.

TABLE 3

[Specifications]

|   | Wide-angle end | Intermediate | Telephoto end |
|---|---|---|---|
| f = | 7.20 | 15.00 | 27.13 |
| FNO = | 2.88 | 3.60 | 4.70 |
| 2ω = | 68.77° | 34.24° | 19.13° |

[Lens Data]

|   | r | d | n | ν |
|---|---|---|---|---|
| 1 | 39.0896 | 0.900 | 1.84666 | 23.78 |
| 2 | 26.1740 | 2.400 | 1.75500 | 52.32 |
| 3 | 847.0754 | (D3) | 1.0 | |
| 4 | 29.8433 | 1.000 | 1.79450 | 45.40 |
| 5 | 6.2925 | 2.350 | 1.0 | |
| 6 | −26.6454 | 0.700 | 1.77250 | 49.61 |
| 7 | 17.2580 | 0.750 | 1.0 | |
| 8 | 13.0478 | 1.700 | 1.84666 | 23.78 |

TABLE 3-continued

[Specifications]

| 9 | 7831.4595 | (D9) | 1.0 | |
|---|---|---|---|---|
| 10 | 0.0000 | 1.700 | 1.0 | Aperture Stop S |
| 11 | 5.3972 | 2.250 | 1.75500 | 52.32 |
| 12 | −53.8427 | 0.450 | 1.0 | |
| 13 | −42.8393 | 0.650 | 1.80809 | 22.76 |
| 14 | 8.9800 | 0.550 | 1.0 | |
| 15 | −17.4827 | 0.900 | 1.79450 | 45.40 |
| 16 | −14.0668 | (D16) | 1.0 | |
| 17 | 16.6627 | 1.700 | 1.60300 | 65.47 |
| 18 | −9944.9996 | (Bf) | 1.0 | |

[Aspherical Surface Data]

Surface Number=5
$\kappa = -2.1043$
$C_4 = +1.4570 \times 10^{-3}$
$C_6 = -8.7419 \times 10^{-6}$
$C_8 = +4.6555 \times 10^{-8}$
$C_{10} = +9.7870 \times 10^{-9}$ Surface Number=15
$\kappa = 4.5475$
$C_4 = -5.7196 \times 10^{-4}$
$C_6 = +1.7009 \times 10^{-9}$
$C_8 = +1.6752 \times 10^{-5}$
$C_{10} = -1.2084 \times 10^{-6}$ Surface Number=16
$\kappa = -8.0776$
$C_4 = +5.4710 \times 10^{-4}$
$C_6 = +2.2019 \times 10^{-4}$
$C_8 = +1.1611 \times 10^{-5}$
$C_{10} = +1.1219 \times 10^{-7}$

[Variable Distance Data]

|   | Wide-angle end | Intermediate | Telephoto end |
|---|---|---|---|
| f | 7.2028 | 14.9999 | 27.1330 |
| D3 | 0.7000 | 10.2814 | 17.8673 |
| D9 | 11.8980 | 3.6587 | 0.8000 |
| D16 | 7.6709 | 11.1235 | 19.7736 |
| BF | 6.0304 | 7.0303 | 6.0302 |

[Values for Conditional Expressions]

f1=57.688
f2=−10.162
f3=12.501
(1) (R24+R25)/fw =4.20
(2) Σ2/fw=0.90
(3) R22/fw=0.87
(4) D2/f3=0.04
(5) R11/fw=3.63
(6) f1/(fw·ft)$^{1/2}$=4.13
(7) |f2|/(fw·ft)$^{1/2}$=0.73

Figure 7A:
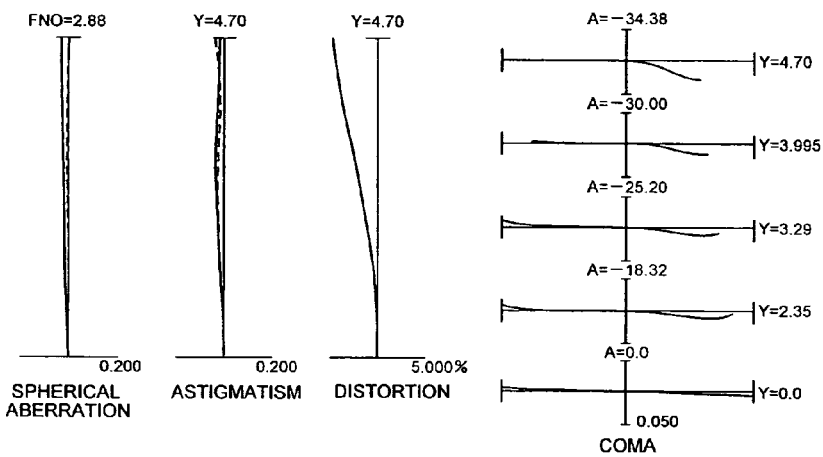
FIG. 7A graphically shows various aberrations of the variable focal length lens system according to Examples 3, 7, and 11 of the present invention in the wide-angle end state when the system is focused at infinity.
Figure 7B:
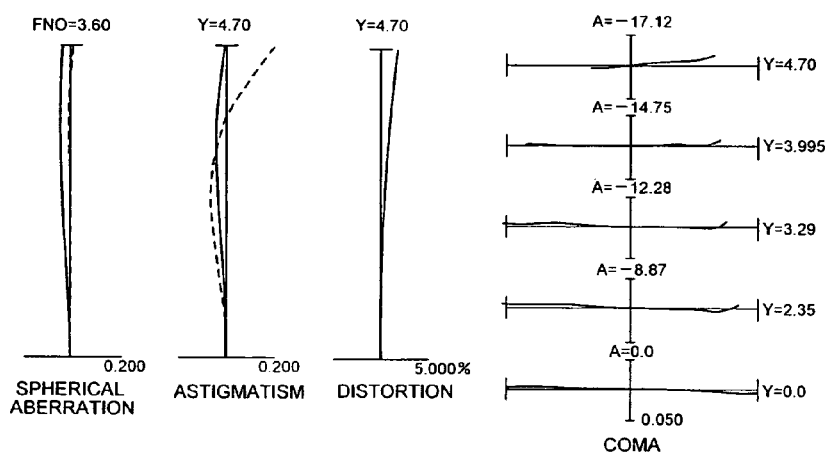
FIG. 7B graphically shows various aberrations of the variable focal length lens system according to Examples 3, 7, and 11 of the present invention in the middle focal length state when the system is focused at infinity.
Figure 7C:
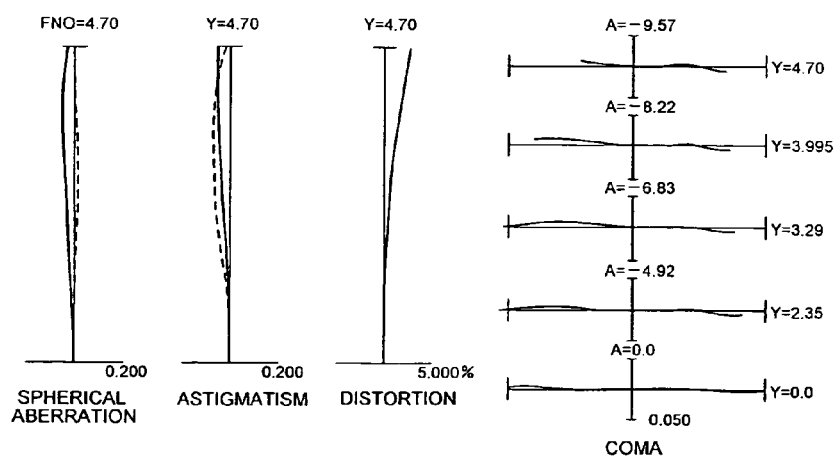
FIG. 7C graphically shows various aberrations of the variable focal length lens system according to Examples 3, 7, and 11 of the present invention in the telephoto end state when the system is focused at infinity.

FIGS. 7A, 7B, and 7C graphically show various aberrations of the variable focal length lens system according to Examples 3 of the present invention in a wide-angle end state (f=7.20), an intermediate focal length state (f=15.00), and a telephoto end state (f=27.13), respectively when the system is focused at infinity.

As is apparent from the respective graphs, the variable focal length lens system according to Example 3 shows superb optical performance as a result of good corrections to various aberrations.

EXAMPLE 4

Figure 8:
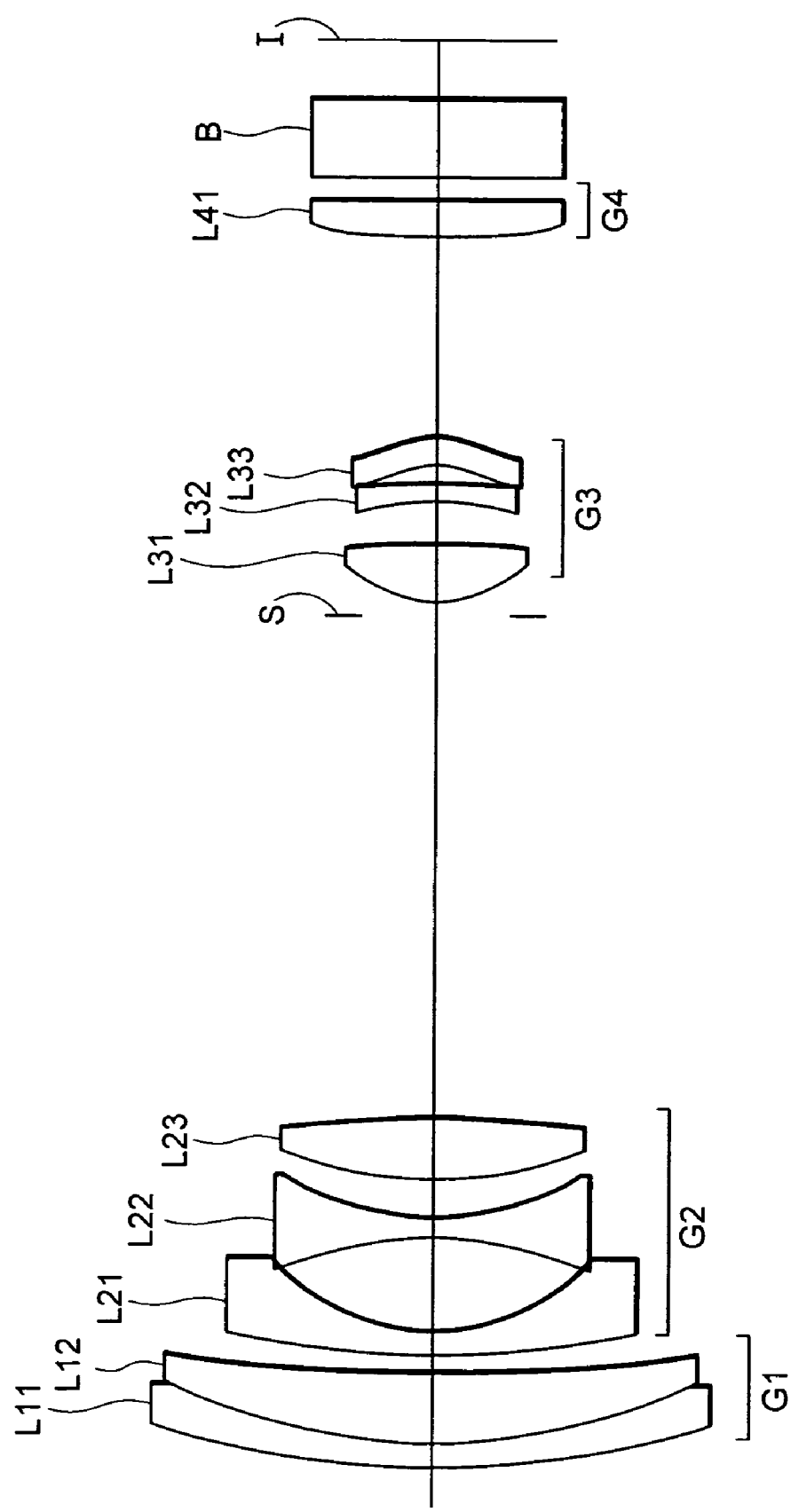
FIG. 8 is a diagram showing the lens arrangement of a variable focal length lens system according to Examples 4, 8, and 12 of the present invention.

FIG. 8 is a diagram showing the lens arrangement of a variable focal length lens system according to Example 4 of the first embodiment of the present invention.

In the variable focal length lens system according to Example 4, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image. A first subgroup having positive refractive power is composed of the positive lens element L31. A second subgroup having negative refractive power is composed of a combination of the negative lens element L32 and the positive lens element L33. By the way, the second subgroup may be composed only of the negative lens element L32.

The fourth lens group G4 is composed of a positive lens element L41 having a convex surface facing to the object.

In the variable focal length lens system according to Example 3, a glass block B is arranged between the fourth lens group G4 and the image plane I. The glass block B has functions of a low-pass filter to eliminate higher spatial frequency than the resolution limit of the imaging device arranged on the image plane I and a cover glass to protect the imaging device. An aperture stop S is arranged to the object side of the third lens group G3 and is moved together with the third lens group G3 when the state of lens group positions varies.

Various values associated with Example 4 are listed in Table 4.

TABLE 4

[Specifications]

|   | Wide-angle end | Intermediate | Telephoto end |
|---|---|---|---|
| f = | 6.45 | 15.00 | 24.30 |
| FNO = | 2.88 | 3.75 | 4.50 |
| 2ω = | 74.84° | 34.56° | 21.72° |

[Lens Data]

|   | r | d | n | ν |
|---|---|---|---|---|
| 1 | 35.5670 | 0.900 | 1.84666 | 23.78 |
| 2 | 25.2949 | 3.000 | 1.81600 | 46.63 |
| 3 | 81.7907 | (D3) | 1.0 | |
| 4 | 55.7736 | 0.950 | 1.69350 | 53.22 |
| 5 | 9.0909 | 4.000 | 1.0 | |
| 6 | −17.9746 | 0.800 | 1.65160 | 58.54 |
| 7 | 11.2326 | 1.650 | 1.0 | |
| 8 | 16.8117 | 2.600 | 1.80610 | 33.27 |
| 9 | −58.3068 | (D9) | 1.0 | |
| 10 | 0.0000 | 0.500 | 1.0 | Aperture Stop S |
| 11 | 5.6321 | 2.700 | 1.49700 | 81.61 |
| 12 | −25.0030 | 1.700 | 1.0 | |
| 13 | −10.2813 | 0.800 | 1.84666 | 23.83 |
| 14 | −38.8327 | 0.650 | 1.0 | |

TABLE 4-continued

[Specifications]

| 15 | −6.3119 | 1.150 | 1.58913 | 61.18 |
|---|---|---|---|---|
| 16 | −6.0000 | (D16) | 1.0 | |
| 17 | 25.0008 | 1.500 | 1.60300 | 65.47 |
| 18 | 0.0000 | (D18) | 1.0 | |
| 19 | 0.0000 | 3.260 | 1.51633 | 64.14 Glass Block |
| 20 | 0.0000 | (Bf) | 1.0 | |

[Aspherical Surface Data]

Surface Number=4
$\kappa = 11.0000$
$C_4 = +8.6165 \times 10^{-5}$
$C_6 = -5.7772 \times 10^{-7}$
$C_8 = +4.8229 \times 10^{-9}$
$C_{10} = +1.9002 \times 10^{-12}$ Surface Number=15
$\kappa = 2.5931$
$C_4 = -4.2473 \times 10^{-4}$
$C_6 = +8.0084 \times 10^{-5}$
$C_8 = +2.0467 \times 10^{-5}$
$C_{10} = -5.5844 \times 10^{-7}$ Surface Number=16
$\kappa = 1.0000$
$C_4 = +2.4812 \times 10^{-4}$
$C_6 = +8.0084 \times 10^{-5}$
$C_8 = +1.4345 \times 10^{-5}$
$C_{10} = -3.5453 \times 10^{-7}$

[Variable Distance Data]

|   | Wide-angle end | Intermediate | Telephoto end |
|---|---|---|---|
| f | 6.4500 | 15.0000 | 24.2971 |
| D3 | 0.7000 | 13.6869 | 20.2971 |
| D9 | 21.5550 | 7.2060 | 1.9990 |
| D16 | 8.5440 | 14.5889 | 19.8175 |
| D18 | 1.0000 | 1.0000 | 1.0000 |
| BF | 2.4410 | 2.4410 | 2.4410 |

[Values for Conditional Expressions]

f1=76.146
f2=−12.086
f3=14.998
(1) (R24+R25)/fw=4.35
(2) Σ2/fw=1.55
(3) R22/fw=1.41
(4) D2/f3=0.11
(5) R11/fw=3.92
(6) f1/(fw·ft)$^{1/2}$=6.08
(7) |f2|/(fw·ft)$^{1/2}$=0.97

Figure 9A:
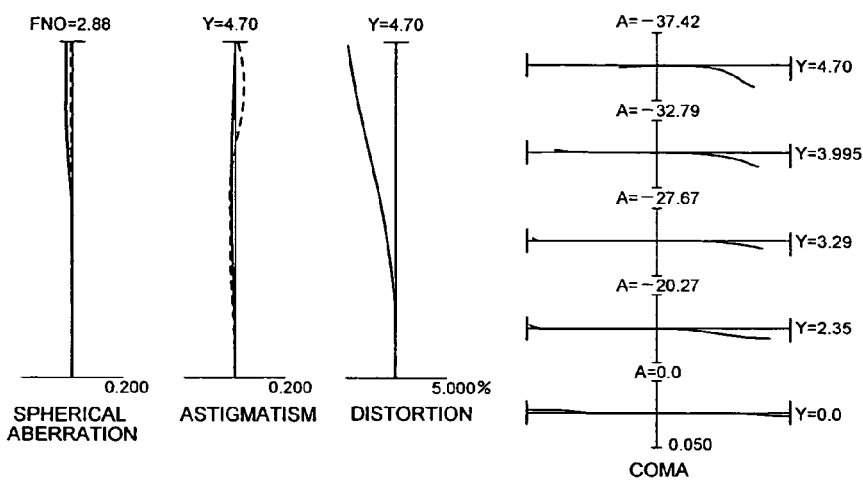
FIG. 9A graphically shows various aberrations of the variable focal length lens system according to Examples 4, 8, and 12 of the present invention in the wide-angle end state when the system is focused at infinity.
Figure 9B:
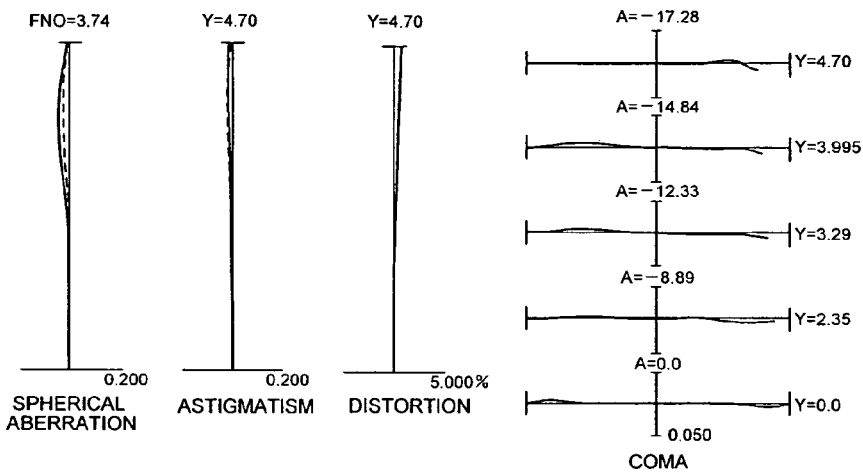
FIG. 9B graphically shows various aberrations of the variable focal length lens system according to Examples 4, 8, and 12 of the present invention in the middle focal length state when the system is focused at infinity.
Figure 9C:
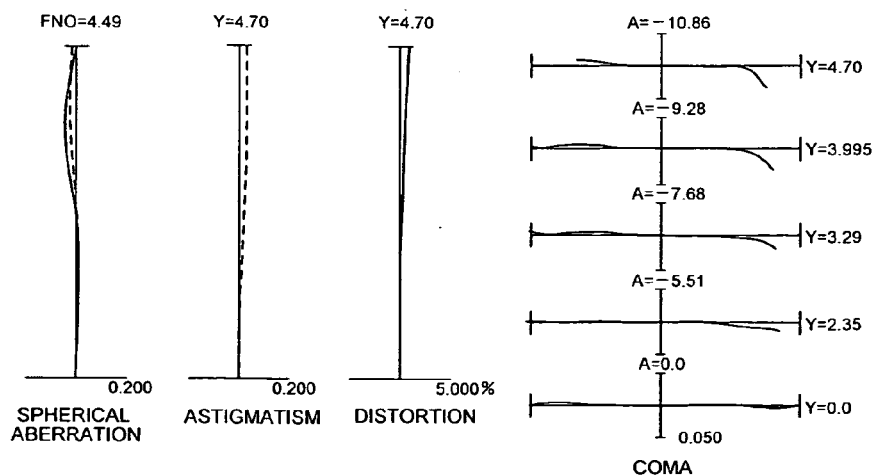
FIG. 9C graphically shows various aberrations of the variable focal length lens system according to Examples 4, 8, and 12 of the present invention in the telephoto end state when the system is focused at infinity.

FIGS. 9A, 9B, and 9C graphically show various aberrations of the variable focal length lens system according to Examples 4 of the present invention in a wide-angle end state (f=6.50), an intermediate focal length state (f=15.00), and a telephoto end state (f=24.30), respectively when the system is focused at infinity.

As is apparent from the respective graphs, the variable focal length lens system according to Example 4 shows superb optical performance as a result of good corrections to various aberrations.

Second Embodiment

A variable focal length lens system according to a second embodiment of the present invention is composed of four lens groups which are, in order from an object, a first lens group having positive refractive power, a second lens group having negative refractive power, a third lens group having positive refractive power, and a fourth lens group having positive refractive power. When the state of lens group positions varies from a wide-angle end state where the focal length of the lens system becomes shortest to a telephoto end state where the focal length of the lens system becomes longest, at least the first lens group moves to the object such that a distance between the first lens group and the second lens group increases, a distance between the second lens group and the third lens group decreases, and a distance between the third lens group and the fourth lens group varies.

In particular, an aperture stop is adjacent to the object side of the third lens group. The third lens group is composed of three lens elements that are, in order from the object, a positive lens element, a negative lens element, and a positive lens element.

With the above-described construction, a variable focal length lens system according to the second embodiment of the present invention makes it possible to realize improvement of the optical performance, compactness, and high zoom ratio. Accordingly, the lens system can be applied to improvement optical performance required for a variable focal length lens system in accordance with high integration of an imaging device and improvement of portability of a camera.

In a variable focal length lens system according to the second embodiment of the present invention, the first lens group and the second lens group are arranged close with each other in the wide-angle end state. Accordingly, off-axis rays passing through the first lens group approach the optical axis, so production of off-axis aberrations can be suppressed.

When the state of lens group positions varies from the wide-angle end state to the telephoto end state, the distance between the first lens group and the second lens group increases. Accordingly, the height of off-axis ray passing through the first lens group is varied actively, thereby preferably correcting variation in off-axis aberrations produced upon changing state of lens group positions.

At the same time, the second lens group and the third lens group are arranged separate with each other in the wide-angle end state. Accordingly, height difference between off-axis ray passing through the second lens group and on-axis ray is made to be large, so on-axis aberration and off-axis aberration can be corrected separately.

When the state of lens group positions varies to the telephoto end state, the distance between the second lens group and the third lens group becomes small. Accordingly, the height of off-axis ray passing through the second lens group is varied actively, so variation in off-axis aberrations produced upon changing state of lens group positions can be corrected.

The variable focal length lens system according to the second embodiment of the present invention actively changes the distances between each lens group by moving the first lens group to the object side to change the total lens length when the state of lens group positions varies from the wide-angle end state to the telephoto end state. Accordingly, variation in various aberrations produced upon changing state of lens group positions can be corrected satisfactory.

For example, in the zoom lens described in Japanese Patent Application Laid-Open No. 2001-188170, the third lens group is composed of, in order from the object, a positive lens element, a cemented negative lens constructed by a positive lens element cemented with a negative lens element. The power arrangement of the positive and the negative refractive power is for satisfactory correcting the negative distortion produced in the wide-angle end state, and the third lens group has strong positive refractive power. Accordingly, in order to construct a lens system with this power arrangement, it is necessary to widen the distance between the positive lens element and the negative lens element, in other words, it is necessary to make the thickness of the third lens group large. Moreover, in the zoom lens according to Japanese Patent Application Laid-Open No. 2001-188170, the distance between the third lens group and the fourth lens group becomes large. Accordingly, the total lens length cannot sufficiently be shortened. On the other hand, when the positive refractive power and the negative refractive power are strengthened to realize compactness of the total lens length, it becomes difficult to realize high optical performance.

As described above, in the variable focal length lens system according to the second embodiment of the present invention, the third lens group is composed of three lens elements that are, in order from the object, a positive lens element, a negative lens element, and a positive lens element. Accordingly, the distance between the third lens group and the fourth lens group can be small and the total lens length can be shortened. Moreover, since the lens construction is a triplet type, high optical performance can be expected.

The respective conditional expressions regarding the variable focal length lens system according to the second embodiment of the present invention are explained below.

The variable focal length lens system according to the second embodiment of the present invention satisfies the following conditional expression (8):

$$0.5 < Da/fw < 1.5 \tag{8}$$

where Da denotes a distance along the optical axis between the most object side lens surface and the most image side lens surface of the third lens group, and fw denotes the focal length of the variable focal length lens system in the wide-angle end state.

Conditional expression (8) defines an appropriate range of the thickness of the third lens group.

When the ratio Da/fw is equal to or exceeds the upper limit of conditional expression (8), the thickness of the third lens group becomes large, thereby becoming difficult to bring the lens system in a compact state. On the other hand, when the ratio is equal to or falls below the lower limit of conditional expression (8), each refractive power of the three lens components consisting of the third lens group becomes large, so it becomes difficult to satisfactory correct coma produced on the periphery of the image frame in the wide-angle end state.

In the variable focal length lens system according to the second embodiment of the present invention, in order to realize high zoom ratio and high optical performance, it is preferable that the distance of each lens group and the total lens length are varied actively when the state of lens group positions varies from the wide-angle end state to the telephoto end state.

In the wide-angle end state in particular, by shortening the total lens length as much as possible the light incident to the first lens group approaches close the optical axis to prevent production of off-axis aberrations. In the telephoto end state, by moving the first lens group to the object side to widen the distance between the first lens group and the second lens group the convergent effect of the first lens group is heightened, so that the total lens length is shortened.

Moreover, in the wide-angle end state, by bringing the third lens group close to the image plane the divergent effect of the first lens group and the second lens group is weakened and at the same time the convergent effect of the third lens group is weakened. When the state of lens group positions varies to the telephoto end state, by moving the third lens group such that the distance between the third lens group and the fourth lens group increases production of off-axis aberrations produced upon changing the state of lens group positions is corrected well.

In the variable focal length lens system according to the second embodiment of the present invention, it is preferable that the following conditional expression is satisfied:

$$1 < \Delta 1/(fw \cdot ft)^{1/2} < 2 \tag{9}$$

where $\Delta 1$ denotes the moving amount of the first lens group upon changing the state of lens group positions from the wide-angle end state to the telephoto end state, and ft denotes the focal length of the variable focal length lens system in the telephoto end state.

Conditional expression (9) defines an appropriate range of the moving amount of the first lens group.

When the ratio $\Delta 1/(fw \cdot ft)^{1/2}$ is equal to or exceeds the upper limit of conditional expression (9), off-axis ray passing through the first lend group in the telephoto end state passes largely away from the optical axis. Accordingly, it not only causes that the lens diameter becomes large but also produces coma largely on the periphery of the image frame.

On the other hand, when the ratio is equal to or falls below the lower limit of conditional expression (9), refractive power of the first lens group and the second lens group become large. Accordingly, it becomes difficult to preferably correct variation in off-axis aberration produced upon changing the state of lens group positions.

In the variable focal length lens system according to the second embodiment of the present invention, in order to realize compactness and high optical performance effectively, the second lens group is composed of three lens elements that is, in order from the object, a first negative lens element having concave surface facing to the image, a second negative lens element having a concave surface facing to the image, and a positive lens element having a convex surface facing to the object and the following conditional expression (10) is preferably satisfied:

$$0.03 < D23/|f2| < 0.20 \tag{10}$$

where D23 denotes the distance between the second negative lens element and the positive lens element, and f2 denotes the focal length of the second lens group.

In the variable focal length lens system according to the second embodiment of the present invention, since the second lens group is the only negative lens group and has strong negative refractive power, it is necessary that various aberrations produced in the second lens group is corrected satisfactory. Moreover, when the lens thickness of the second lens group becomes large, the lens system cannot be housed in a camera for carrying by miniaturizing the lens system. At the same time, since off-axis ray passing through the first lens group passes away from the optical axis, the lens diameter of the first lens group becomes large, so that the diameter of the lens barrel becomes large.

As described above, in the variable focal length lens system according to the second embodiment of the present invention, the second lens group is composed of three lens elements that is, in order from the object, a first negative lens element having a concave surface facing to the image, a second negative lens element having a concave surface facing to the image, and a positive lens element having a convex surface facing to the object. The second negative lens element and the positive lens element form a doublet. With this construction, positive spherical aberration produced in the second lens group can be corrected well and off-axis aberrations can be corrected by the first negative lens element arranged to the object side of the second negative lens element.

Furthermore, since the aperture stop is arranged to the image side of the second negative lens element, off-axis aberrations are corrected by the first negative lens element and on-axis aberrations can be corrected by the second negative lens element and the positive lens element arranged in the vicinity of the aperture stop.

Since refractive index of the second lens group is large as described above, in order to satisfactory correct positive spherical aberration it is preferable to suitably arrange the distance between the second negative lens element and the positive lens element. Therefore, the variable focal length lens system according to the second embodiment of the present invention preferably satisfies the above-described conditional expression (10).

Conditional expression (10) defines an appropriate range of the distance between the second negative lens element and the positive lens element of the second lens group.

When the ratio $D23/|f2|$ is equal to or exceeds the upper limit of conditional expression (10), off-axis ray passing through the first lens element passes away from the optical axis. Accordingly, coma produced on the periphery of the image frame in the wide-angle end state cannot be corrected. In addition, the lens barrel becomes large.

On the other hand, when the ratio is equal to or falls below the lower limit of conditional expression (10), refractive power of the second negative lens element and the positive lens element in the second lens group becomes large. Accordingly, optical performance is severely degraded by minute decentering produced upon manufacturing.

In the variable focal length lens system according to the second embodiment of the present invention, in order to narrower the lens system the first lens group is preferably composed of a cemented lens constructed by a negative meniscus lens having a convex surface facing to the object cemented with a positive lens. In addition, in order to satisfactory correct variation in coma produced upon changing the angle of view in the wide-angle end state, the following conditional expression (11) is preferably satisfied:

$$D1/R1 < (fw^2/(fw^2 + y_{max}^2))^{1/2} \tag{11}$$

where D1 denotes a distance between the most object side lens surface of the first lens group and the aperture stop in the wide-angle end state, R1 denotes a radius of curvature of the most object side lens surface of the first lens group, and $y_{max}$ denotes the maximum image height.

Conditional expression (11) defines an appropriate range of an angle of incidence of off-axis ray incident to the first lens group. The value $(fw^2/(fw^2 + y_{max}^2))^{1/2}$ in conditional expression (11) is in relation to a half angle of view in the wide-angle end state. In an orthographic projection system, which is generally used, the expression y=f·tan θ is used as the standard where y denotes an image height, f denotes the focal-length, and θ denotes a half angle of view. Accordingly, when a half angle of view θ is from 0° to 90°, cos θ is expressed by cos θ=(f$^2$/(f$^2$+y$^2$))$^{1/2}$. In other words, cosine of a half angle of view in the wide-angle end state becomes the right side of conditional expression (11).

When the left side value D1/R1 is equal to or exceeds the upper limit of conditional expression (11), off-axis ray approaching the periphery of the image frame in the wide-angle end state tends to refract to the direction away from the optical axis at the most object side lens surface of the first lens group. The most object side lens surface is originally a convex surface, so the incident ray tends to refract to approach the optical axis at the central portion of the image. However, refractive power becomes weak upon changing the angle of view, so the ray tends to refract away from the optical axis on the periphery of the image frame. Accordingly, high order curvature of field tends to be produced. Since curvature of field is easy to be produced in the wide-angle end state, in particular, where the angle of view becomes large, in order to obtain high optical performance it is necessary to suitably arrange the distance between the most object side lens surface of the first lens group and the aperture stop, and the radius of curvature of the most object side lens surface.

In the variable focal length lens system according to the second embodiment of the present invention, by applying an aspherical lens higher optical performance can be realized. In particular, when the first negative lens element of the second lens group is made to be an aspherical lens, off-axis aberrations produced in the wide-angle end state can be corrected well. Moreover, when an aspherical lens is introduced in the third lens group, coma produced on the periphery of the image frame in the wide-angle end state can be corrected well. Furthermore, further high optical performance can be realized by introducing a plurality of aspherical lenses in the lens system.

In the variable focal length lens system according to the second embodiment of the present invention, in order to accomplish compactness, the number of lens elements is made to be fewer as much as possible. However, when at least one lens element of the three lens elements composing the third lens group, for example, is made to be a cemented lens, higher optical performance can be realized. When at least one lens element composing the second lens group is made to be a cemented lens, higher optical performance can be realized.

In the variable focal length lens system according to the second embodiment of the present invention, by shifting a lens group in the entirety thereof of the lens groups composing the lens system or a portion of a lens group substantially perpendicular to the optical axis, image can be shifted. Accordingly, the variable focal length lens system according to the second embodiment of the present invention can be used as a vibration reduction optical system in combination with a vibration detector for detecting vibration of a camera, a driver for shifting above-described one lens group or a portion of a lens group, and a controller for controlling the driver to correct the vibration detected by the vibration detector.

In the variable focal length lens system according to the second embodiment of the present invention, it is suitable for suppressing variation in various aberrations to move the second lens to the fourth lens groups along the optical axis upon focusing a close object. In particular, in the following Examples, although the fourth lens group is composed of a positive lens element, in order to correct variation in off-axis aberrations produced upon focusing close object, the fourth lens group may be constructed by a cemented lens.

In the variable focal length lens system according to the second embodiment of the present invention, in order to prevent production of moiré pattern to the image side of the lens system, a low-pass filter or an infrared-cut filter in accordance with the frequency characteristic of the detector may be arranged.

The variable focal length lens system according to the second embodiment of the present invention can be applied to a so-called varifocal lens whose state of focal length does not exist continuously.

FIG. 1 is a diagram showing the power arrangement of a variable focal length lens system according to each Example of the present invention, in which W denotes a wide-angle end state and T denotes a telephoto end state.

The variable focal length lens system according to each Example of the second embodiment of the present invention is composed of, in order from an object, a first-lens group G1 having positive refractive power, a second lens group G2 having negative refractive power, a third lens group G3 having positive refractive power, and a fourth lens group G4 having positive refractive power. When the state of lens group positions varies from the wide-angle end state to the telephoto end state, the first lens group G1 and the third lens group G3 are moved to the object such that a distance between the first lens group G1 and the second lens group G2 increases, a distance between the second lens group G2 and the third lens group G3 decreases, and a distance between the third lens group G3 and the fourth lens group G4 increases. At this time, the second lens group G2 is moved to the object or at first moved to the image and then moved to the object. The fourth lens group G4 is fixed or at first moved to the object and then moved to the image.

Incidentally, respective Examples 5 through 8 of the second embodiment are the same as Examples 1 through 4, respectively.

EXAMPLE 5

FIG. 2 is a diagram showing the lens arrangement of a variable focal length lens system according to Example 5 of the second embodiment of the present invention.

In the variable focal length lens system according to Example 5, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image.

The fourth lens group G4 is composed of a positive lens element L41 having a convex surface facing to the object.

In the variable focal length lens system according to Example 5, an aperture stop S is arranged to the object side of the third lens group G3 and is moved together with the third lens group G3 when the state of lens group positions varies.

Various values associated with Example 5 are listed in Table 5.

TABLE 5

[Specifications]

|  | Wide-angle end | Intermediate | Telephoto end |
|---|---|---|---|
| f = | 6.39 | 14.40 | 27.16 |
| FNO = | 2.88 | 4.07 | 4.57 |
| 2ω = | 75.21° | 35.49° | 19.12° |

[Lens Data]

| | r | d | n | ν |
|---|---|---|---|---|
| 1 | 40.2543 | 0.900 | 1.84666 | 23.78 |
| 2 | 26.0490 | 2.800 | 1.75500 | 52.32 |
| 3 | −1909.4996 | (D3) | 1.0 | |
| 4 | 37.9055 | 1.000 | 1.79450 | 45.40 |
| 5 | 7.0398 | 2.450 | 1.0 | |
| 6 | −61.1984 | 0.700 | 1.77250 | 49.61 |
| 7 | 10.3694 | 1.200 | 1.0 | |
| 8 | 11.9637 | 1.800 | 1.84666 | 23.78 |
| 9 | 134.7168 | (D9) | 1.0 | |
| 10 | 0.0000 | 2.000 | 1.0 | Aperture Stop S |
| 11 | 5.3928 | 2.250 | 1.72916 | 54.66 |
| 12 | −42.5477 | 0.800 | 1.0 | |
| 13 | −16.5589 | 0.650 | 1.80809 | 22.76 |
| 14 | 13.3606 | 0.450 | 1.0 | |
| 15 | −12.4508 | 0.900 | 1.79450 | 45.40 |
| 16 | −11.0987 | (D16) | 1.0 | |
| 17 | 12.3487 | 2.300 | 1.49700 | 81.61 |
| 18 | −9944.9996 | (Bf) | 1.0 | |

[Aspherical Surface Data]

Surface Number=5
$\kappa = -2.5765$
$C_4 = +1.1581 \times 10^{-3}$
$C_6 = -9.5500 \times 10^{-6}$
$C_8 = +2.2307 \times 10^{-8}$
$C_{10} = +4.0283 \times 10^{-9}$ Surface Number=15
$\kappa = 8.1170$
$C_4 = +7.3841 \times 10^{-4}$
$C_6 = +3.9143 \times 10^{-4}$
$C_8 = -1.0685 \times 10^{-5}$
$C_{10} = -3.0515 \times 10^{-8}$ Surface Number=16
$\kappa = -9.0000$
$C_4 = +7.9978 \times 10^{-4}$
$C_6 = +4.2205 \times 10^{-4}$
$C_8 = -1.0964 \times 10^{-5}$
$C_{10} = +1.0713 \times 10^{-6}$

[Variable Distance Data]

| | Wide-angle end | Intermediate | Telephoto end |
|---|---|---|---|
| f | 6.3854 | 14.3998 | 27.1599 |
| D3 | 0.7000 | 10.3807 | 17.4976 |
| D9 | 12.6680 | 3.6276 | 0.5852 |
| D16 | 6.2413 | 11.1178 | 21.0512 |
| BF | 6.0304 | 7.7015 | 6.0299 |

[Values for Conditional Expressions]
f2=−9.6564
(8) Da/fw=0.79
(9) Δ1/(fw·ft)$^{1/2}$=1.48
(10) |D23/f2|=0.12
(11) D1/R1=0.60

$(fw^2/(fw^2+y_{max}^2))^{1/2} = 0.81$

FIGS. 3A, 3B, and 3C graphically show various aberrations of the variable focal length lens system according to Examples 5 of the second embodiment of the present invention in a wide-angle end state (f=6.39), an intermediate focal length state (f=14.40), and a telephoto end state (f=27.16), respectively when the system is focused at infinity.

As is apparent from the respective graphs, the variable focal length lens system according to Example 5 shows superb optical performance as a result of good corrections to various aberrations.

EXAMPLE 6

FIG. 4 is a diagram showing the lens arrangement of a variable focal length lens system according to Example 6 of the second embodiment of the present invention.

In the variable focal length lens system according to Example 6, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image.

The fourth lens group G4 is composed of a positive lens element L41 having a convex surface facing to the object.

In the variable focal length lens system according to Example 6, an aperture stop S is arranged to the object side of the third lens group G3 and is moved together with the third lens group G3 when the state of lens group positions varies.

Various values associated with Example 6 are listed in Table 6.

TABLE 6

[Specifications]

|  | Wide-angle end | Intermediate | Telephoto end |
|---|---|---|---|
| f = | 6.70 | 14.60 | 27.13 |
| FNO = | 2.88 | 3.84 | 4.78 |
| 2ω = | 72.72° | 35.08° | 19.27° |

[Lens Data]

| | r | d | n | ν |
|---|---|---|---|---|
| 1 | 38.2542 | 0.900 | 1.84666 | 23.78 |
| 2 | 26.4710 | 2.500 | 1.77250 | 49.61 |
| 3 | 155.9562 | (D3) | 1.0 | |

TABLE 6-continued

[Specifications]

| | | | | |
|---|---|---|---|---|
| 4 | 36.3311 | 1.000 | 1.79450 | 45.40 |
| 5 | 7.7749 | 2.650 | 1.0 | |
| 6 | −76.4394 | 0.700 | 1.75500 | 52.32 |
| 7 | 12.5365 | 1.650 | 1.0 | |
| 8 | 14.2461 | 1.800 | 1.84666 | 23.78 |
| 9 | 101.9364 | (D9) | 1.0 | |
| 10 | 0.0000 | 1.700 | 1.0 | Aperture Stop S |
| 11 | 5.9506 | 2.150 | 1.72916 | 54.66 |
| 12 | −121.3146 | 1.000 | 1.0 | |
| 13 | −25.5408 | 0.650 | 1.80809 | 22.76 |
| 14 | 11.8809 | 0.500 | 1.0 | |
| 15 | −19.0549 | 0.900 | 1.69350 | 53.22 |
| 16 | −11.2921 | (D16) | 1.0 | |
| 17 | 23.5288 | 1.350 | 1.75500 | 52.32 |
| 18 | 0.0000 | (Bf) | 1.0 | |

[Aspherical Surface Data]
Surface Number=5
κ=−3.3630
$C_4$=+1.0617×10$^{-3}$
$C_6$=−1.6626×10$^{-5}$
$C_8$=+3.2651×10$^{-7}$
$C_{10}$=−2.2032×10$^{-9}$
Surface Number=15
κ=1.0000
$C_4$=−3.1648×10$^{-4}$
$C_6$=+1.0222×10$^{-4}$
$C_8$=+1.7755×10$^{-5}$
$C_{10}$=−9.2894×10$^{-7}$
Surface Number=16
κ=−1.4398
$C_4$=+5.8112×10$^{-4}$
$C_6$=+1.2537×10$^{-4}$
$C_8$=+1.3154×10$^{-5}$
$C_{10}$=−1.7033×10$^{-7}$

[Variable Distance Data]

| | Wide-angle end | Intermediate | Telephoto end |
|---|---|---|---|
| f | 6.6999 | 14.5999 | 27.1315 |
| D3 | 0.7000 | 11.3350 | 21.4250 |
| D9 | 16.0590 | 5.7222 | 0.9432 |
| D16 | 8.0203 | 14.0854 | 20.0819 |
| BF | 6.0303 | 6.0303 | 6.0300 |

[Values for Conditional Expressions]
f2=−11.2610
(8) Da/fw=0.78
(9) Δ1/(fw·ft)$^{1/2}$=1.31
(10) D23/|f2|=0.15
(11) D1/R1=0.73

$(fw^2/(fw^2+y_{max}^2))^{1/2}$=0.82

FIGS. 5A, 5B, and 5C graphically show various aberrations of the variable focal length lens system according to Examples 6 of the present invention in a wide-angle end state (f=6.70), an intermediate focal length state (f=14.60), and a telephoto end state (f=27.13), respectively when the system is focused at infinity.

As is apparent from the respective graphs, the variable focal length lens system according to Example 6 shows superb optical performance as a result of good corrections to various aberrations.

EXAMPLE 7

FIG. 6 is a diagram showing the lens arrangement of a variable focal length lens system according to Example 7 of the second embodiment of the present invention.

In the variable focal length lens system according to Example 7, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image.

The fourth lens group G4 is composed of a positive lens element L41 having a convex surface facing to the object.

In the variable focal length lens system according to Example 7, an aperture stop S is arranged to the object side of the third lens group G3 and is moved together with the third lens group G3 when the state of lens group positions varies. Various values associated with Example 7 are listed in Table 7.

TABLE 7

[Specifications]

| | Wide-angle end | Intermediate | Telephoto end |
|---|---|---|---|
| f = | 7.20 | 15.00 | 27.13 |
| FNO = | 2.88 | 3.60 | 4.70 |
| 2ω = | 68.77° | 34.24° | 19.13° |

[Lens Data]

| | r | d | n | ν |
|---|---|---|---|---|
| 1 | 39.0896 | 0.900 | 1.84666 | 23.78 |
| 2 | 26.1740 | 2.400 | 1.75500 | 52.32 |
| 3 | 847.0754 | (D3) | 1.0 | |
| 4 | 29.8433 | 1.000 | 1.79450 | 45.40 |
| 5 | 6.2925 | 2.350 | 1.0 | |
| 6 | −26.6454 | 0.700 | 1.77250 | 49.61 |
| 7 | 17.2580 | 0.750 | 1.0 | |
| 8 | 13.0478 | 1.700 | 1.84666 | 23.78 |
| 9 | 7831.4595 | (D9) | 1.0 | |
| 10 | 0.0000 | 1.700 | 1.0 | Aperture Stop S |
| 11 | 5.3972 | 2.250 | 1.75500 | 52.32 |
| 12 | −53.8427 | 0.450 | 1.0 | |
| 13 | −42.8393 | 0.650 | 1.80809 | 22.76 |
| 14 | 8.9800 | 0.550 | 1.0 | |
| 15 | −17.4827 | 0.900 | 1.79450 | 45.40 |
| 16 | −14.0668 | (D16) | 1.0 | |
| 17 | 16.6627 | 1.700 | 1.60300 | 65.47 |
| 18 | −9944.9996 | (Bf) | 1.0 | |

[Aspherical Surface Data]
Surface Number=5
κ=−2.1043
$C_4$=+1.4570×10$^{-3}$
$C_6$=−8.7419×10$^{-6}$
$C_8$=+4.6555×10$^{-8}$
$C_{10}$=+9.7870×10$^{-9}$ Surface Number=15
$\kappa$=4.5475
$C_4$=−5.7196×10$^{-4}$
$C_6$=+1.7009×10$^{-4}$
$C_8$=+1.6752×10$^{-5}$
$C_{10}$=−1.2084×10$^{-6}$
Surface Number=16
$\kappa$=−8.0776
$C_4$=+5.4710×10$^{-4}$
$C_6$=+2.2019×10$^{-4}$
$C_8$=+1.1611×10$^{-5}$
$C_{10}$=+1.1219×10$^{-7}$

[Variable Distance Data]

|    | Wide-angle end | Intermediate | Telephoto end |
|----|----------------|--------------|---------------|
| f  | 7.2028         | 14.9999      | 27.1330       |
| D3 | 0.7000         | 10.2814      | 17.8673       |
| D9 | 11.8980        | 3.6587       | 0.8000        |
| D16| 7.6709         | 11.1235      | 19.7736       |
| BF | 6.0304         | 7.0303       | 6.0302        |

[Values for Conditional Expressions]
f2=−10.162
(8) Da/fw=0.67
(9) $\Delta$1/(fw·ft)$^{1/2}$=1.30
(10) D23/|f2|=0.07
(11) D1/R1=0.57

$(fw^2/(fw^2+y_{max}^2))^{1/2}$=0.84

FIGS. 7A, 7B, and 7C graphically show various aberrations of the variable focal length lens system according to Examples 7 of the present invention in a wide-angle end state (f=7.20), an intermediate focal length state (f=15.00), and a telephoto end state (f=27.13), respectively when the system is focused at infinity.

As is apparent from the respective graphs, the variable focal length lens system according to Example 7 shows superb optical performance as a result of good corrections to various aberrations.

EXAMPLE 8

FIG. 8 is a diagram showing the lens arrangement of a variable focal length lens system according to Example 8 of the second embodiment of the present invention.

In the variable focal length lens system according to Example 8, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image.

The fourth lens group G4 is composed of a positive lens element L41 having a convex surface facing to the object.

In the variable focal length lens system according to Example 8, a glass block B is arranged between the fourth lens group G4 and the image plane I. The glass block B has functions of a low-pass filter to eliminate higher spatial frequency than the resolution limit of the imaging device arranged on the image plane I and a cover glass to protect the imaging device. An aperture stop S is arranged to the object side of the third lens group G3 and is moved together with the third lens group G3 when the state of lens group positions varies.

Various values associated with Example 8 are listed in Table 8.

TABLE 8

[Specifications]

|      | Wide-angle end | Intermediate | Telephoto end |
|------|----------------|--------------|---------------|
| f=   | 6.45           | 15.00        | 24.30         |
| FNO= | 2.88           | 3.75         | 4.50          |
| 2ω=  | 74.84°         | 34.56°       | 21.72°        |

[Lens Data]

|    | r        | d      | n       | ν              |
|----|----------|--------|---------|----------------|
| 1  | 35.5670  | 0.900  | 1.84666 | 23.78          |
| 2  | 25.2949  | 3.000  | 1.81600 | 46.63          |
| 3  | 81.7907  | (D3)   | 1.0     |                |
| 4  | 55.7736  | 0.950  | 1.69350 | 53.22          |
| 5  | 9.0909   | 4.000  | 1.0     |                |
| 6  | −17.9746 | 0.800  | 1.65160 | 58.54          |
| 7  | 11.2326  | 1.650  | 1.0     |                |
| 8  | 16.8117  | 2.600  | 1.80610 | 33.27          |
| 9  | −58.3068 | (D9)   | 1.0     |                |
| 10 | 0.0000   | 0.500  | 1.0     | Aperture Stop S|
| 11 | 5.6321   | 2.700  | 1.49700 | 81.61          |
| 12 | −25.0030 | 1.700  | 1.0     |                |
| 13 | −10.2813 | 0.800  | 1.84666 | 23.83          |
| 14 | −38.8327 | 0.650  | 1.0     |                |
| 15 | −6.3119  | 1.150  | 1.58913 | 61.18          |
| 16 | −6.0000  | (D16)  | 1.0     |                |
| 17 | 25.0008  | 1.500  | 1.60300 | 65.47          |
| 18 | 0.0000   | (D18)  | 1.0     |                |
| 19 | 0.0000   | 3.260  | 1.51633 | 64.14 Glass Block |
| 20 | 0.0000   | (Bf)   | 1.0     |                |

[Aspherical Surface Data]
Surface Number=4
$\kappa$=11.0000
$C_4$=+8.6165×10$^{-5}$
$C_6$=−5.7772×10$^{-7}$
$C_8$=+4.8229×10$^{-9}$
$C_{10}$=+1.9002×10$^{-12}$
Surface Number=15
$\kappa$=2.5931
$C_4$=−4.2473×10$^{-4}$
$C_6$=+8.0084×10$^{-5}$
$C_8$=+2.0467×10$^{-5}$
$C_{10}$=−5.5844×10$^{-7}$
Surface Number=16
$\kappa$=1.0000
$C_4$=+2.4812×10$^{-4}$
$C_6$=+8.0084×10$^{-5}$
$C_8$=+1.4345×10$^{-5}$
$C_{10}$=−3.5453×10$^{-7}$

[Variable Distance Data]

| | Wide-angle end | Intermediate | Telephoto end |
|---|---|---|---|
| f | 6.4500 | 15.0000 | 24.2971 |
| D3 | 0.7000 | 13.6869 | 20.2971 |
| D9 | 21.5550 | 7.2060 | 1.9990 |
| D16 | 8.5440 | 14.5889 | 19.8175 |
| D18 | 1.0000 | 1.0000 | 1.0000 |
| BF | 2.4410 | 2.4410 | 2.4410 |

[Values for Conditional Expressions]
f2=−12.086
(8) Σ3/fw=1.09
(9) Δ1/(fw·ft)$^{1/2}$=0.90
(10) D23/|f2|=0.14
(11) D1/R1=1.02

$(fw^2/(fw^2+y_{max}^2))^{1/2}$=0.81

FIGS. 9A, 9B, and 9C graphically show various aberrations of the variable focal length lens system according to Examples 8 of the present invention in a wide-angle end state (f=6.50), an intermediate focal length state (f=15.00), and a telephoto end state (f=24.30), respectively when the system is focused at infinity.

As is apparent from the respective graphs, the variable focal length lens system according to Example 8 shows superb optical performance as a result of good corrections to various aberrations.

Third Embodiment

A variable focal length lens system according to a third embodiment of the present invention is composed of four lens groups which are, in order from an object, a first lens group having positive refractive power, a second lens group having negative refractive power, a third lens group having positive refractive power, and a fourth lens group having positive refractive power. An aperture stop is arranged in the vicinity of the third lens group. When the state of lens group positions varies from a wide-angle end state where the focal length of the lens system becomes shortest to a telephoto end state where the focal length of the lens system becomes longest, at least the first lens group and the third lens group move to the object such that a distance between the first lens group and the second lens group increases, a distance between the second lens group and the third lens group decreases, and a distance between the third lens group and the fourth lens group increases.

Generally, in a zoom lens system having a plurality of lens groups, since the number of moveable lens groups upon changing the state of lens group positions increases, variation in off-axis aberrations produced upon changing the state of lens group positions can be corrected satisfactory. Accordingly, the zoom ratio that is the value of the focal length of the lens system in the telephoto end state divided by that in the wide-angle end state can be increased.

In order to correct satisfactory variation in off-axis aberrations produced upon changing the state of lens group positions in particular, it is important to move each lens group actively. For that purpose, by increasing the moving amount of each lens group, the height of off-axis rays passing through each lens group can be varied actively and variation in off-axis aberrations can be corrected satisfactory. Moreover, by arranging at least one moveable lens group to both image side and object side of the aperture stop ray aberrations upper than the principal ray and ray aberrations lower than the principal ray can be corrected satisfactory.

In particular, a variable focal length lens system according to a third embodiment of the present invention satisfies the following conditions A, B and C.

Condition A: The moving amount of the first lens group upon changing the state of lens group positions is suitably set.

Condition B: The second lens group is moved at first to the image side and then to the object side upon changing the state of lens group positions.

Condition C: The distance between the third lens group and the fourth lens group in the wide-angle end state is suitably set.

In a variable focal length lens system according to a third embodiment of the present invention, by moving the first lens group to the object upon changing the state of lens group positions from the wide-angle end state to the telephoto end state, off-axis rays passing through the first lens group do not leave away from the optical axis in the wide-angle end state, and on-axis rays passing through the first lens group converge strongly in the telephoto end state. By constructing in this way, the lens diameter of the first lens group can be small and the total lens length of the lens system in the telephoto end state can be short. The more increase the moving amount of the first lens group, the more leave off-axis ray passing through the first lens group from the optical axis. Therefore, condition A is important for the variable focal length lens system according to a third embodiment.

In a variable focal length lens system according to a third embodiment of the present invention, the first lens group and the second lens group are located closely in the wide-angle end state so that off-axis ray passing through the first lens group does not leave widely from the optical axis. Accordingly, production of off-axis aberrations produced in the first lens group can be suppressed and off-axis aberrations can be corrected by the second lens group.

Moreover, in a variable focal length lens system according to a third embodiment of the present invention, in order to satisfactory suppress variation in off-axis aberrations produced upon changing the state of lens group positions, when the state of lens group positions varies from the wide-angle end state to the telephoto end state, the first lens group is moved to the object side, but the second lens group is moved at first to the image side. Accordingly, off-axis ray passing through the first lens group leaves away from the optical axis, so off-axis aberrations can be corrected.

Furthermore, in a variable focal length lens system according to a third embodiment of the present invention, when the state of lens group positions varies to approach the telephoto end state, if the distance between the first lens group and the second lens group separate widely, off-axis ray excessively leaves from the optical axis. Accordingly, a variable focal length lens system according to a third embodiment of the present invention is constructed such that when the state of lens group positions varies from the wide-angle end state to the telephoto end state, the second lens group moved at first to the image side is moved to the object side as the state approaching the telephoto end state. Accordingly, condition B is important for the variable focal length lens system according to the third embodiment of the present invention.

Moreover, in a camera for recording an image of a subject by using an imaging device, the position of the exit pupil of the lens system has a restriction. Therefore, in a variable focal length lens system according to the third embodiment of the present invention, in order to keep the position of the exit pupil away form the imaging device in the wide-angle end state, in particular, where the angle of incidence into the lens system becomes large, the distance between the third lens group and the fourth lens group is made to be large. Therefore, condition C is important for a variable focal length lens system according to the third embodiment of the present invention.

With the construction described above, a variable focal length lens system according to the third embodiment of the present invention makes it possible to realize improvement of optical performance, compactness, and high zoom ratio. Accordingly, with the improvement of integration of an imaging device and portability of a camera, compactness and improvement of optical performance required to a variable focal length lens system can be satisfied.

Conditional expressions of a variable focal length lens system according to the third embodiment of the present invention are going to be explained below.

In a variable focal length lens system according to the third embodiment of the present invention, the following conditional expressions (12) and (13) are satisfied:

$$0.15 < \Delta 1/(Z \cdot (fw \cdot ft)^{1/2}) < 0.5 \qquad (12)$$

$$0.6 < D34W/fw < 1.7 \qquad (13)$$

where $\Delta 1$ denotes a moving amount of the first lens group when the state of lens group positions varies from the wide-angle end state to the telephoto end state, fw denotes the focal length of the variable focal length lens system in the wide-angle end state, ft denotes the focal length of the variable focal length lens system in the telephoto end state, Z denotes a zoom ratio (ft/fw), and D34W denotes a distance along the optical axis between the third lens group and the fourth lens group in the wide-angle end state Conditional expression defines an appropriate range of the moving amount of the first lens group and numerically concretely limits condition A described above.

When the ratio $\Delta 1/(Z \cdot (fw \cdot ft)^{1/2})$ is equal to or exceeds the upper limit of conditional expression (12), off-axis ray passing through the first lens group leaves largely away from the optical axis. Accordingly, the lens diameter cannot be small enough. On the other hand, when the ratio is equal to or falls below the lower limit of conditional expression (12), the total lens length in the wide-angle end state becomes large. Accordingly, off-axis ray passing through the first and second lens groups leaves away from the optical axis in the wide-angle end state, so that the lens diameter cannot be made to be small enough. Incidentally, when the total lens length in the telephoto end state becomes short, convergent effect of the first lens group has to be strong.

Conditional expression (13) defines an appropriate range of the distance along the optical axis between the third lens group and the fourth lens group in the wide-angle end state.

When the ratio D34W/fw is equal to or exceeds the upper limit of conditional expression (13), the total lens length of the lens system becomes large, so the lens system cannot be made to be sufficiently compact. On the other hand, when the ratio is equal to or falls below the lower limit of conditional expression (13), the position of the exit pupil approaches the imaging device too closely in the wide-angle end state.

In a variable focal length lens system according to the third embodiment of the present invention, when the ratio D34W/fw of the conditional expression (13) becomes small, refractive power of each lens group consisting of the third lens group tends to become large. Accordingly, in order to maintain a stable optical quality upon manufacturing in volume, it is preferable to set the lower limit of conditional expression (13) to 0.7.

In a variable focal length lens system according to the third embodiment of the present invention, in order to satisfactory correct variation in various aberrations produced upon changing state of lens group positions, the above-described conditions A, B and C are preferably satisfied and, in addition, the following conditions D and E are preferably satisfied:

Condition D: A distance between the second lens group and the third lens group should be set suitably.

Condition E: The moving amount of the third lens group upon changing the state of lens group positions should be set suitably.

In a variable focal length lens system according to the third embodiment of the present invention, the first lens group and the second lens group have negative refractive power as a whole in the wide-angle end state, so that diverged bundle of ray is converged by the third lens group. Accordingly, when the distance between the second lens group and the third lens group becomes too wide, on-axis bundle of ray incident to the third lens group spreads out, so that negative spherical aberration is produced largely. On the other hand, when the distance between the second lens group and the third lens group becomes too close, off-axis ray passing through the second lens group approaches the optical axis, so that variation in off-axis aberrations produced upon varying the angle of view cannot be corrected satisfactory. Accordingly, in order to satisfactory correct off-axis aberrations in the wide-angle end state, condition D is important for a variable focal length lens system according to the third embodiment of the present invention.

In a variable focal length lens system according to the third embodiment of the present invention, the distance between the second lens group and the third lens group is widened and, at the same time, the moving amount of the third lens group is suitably set.

In order to converge bundle of ray diverged by the second lens group, the third lens group has strong positive refractive power. Accordingly, when the moving amount of the third lens group becomes large, a using magnification of the third lens group varies largely upon changing the state of lens group positions. Therefore, negative spherical aberration produced upon changing the state of lens group positions becomes difficult to correct satisfactory. Thus, in a variable focal length lens system according to the third embodiment of the present invention, condition E is important for realizing high optical performance at the center of the image frame regardless of the state of lens group positions.

In a variable focal length lens system according to the third embodiment of the present invention, in order to satisfy the above-described conditions D and E harmoniously, the following conditional expression (14) is preferably satisfied:

$$0.7 < D23W/\Delta 3 < 2.5 \qquad (14)$$

where D23W denotes a distance along the optical axis between the second lens group and the third lens group in the wide-angle end state, and $\Delta 3$ denotes a moving amount of the third lens group when the state of lens group positions varies from the wide-angle end state to the telephoto end state.

Conditional expression (14) defines an appropriate range of the ratio of a distance along the optical axis between the second lens group and the third lens group in the wide-angle end state to a moving amount of the third lens group when the state of lens group positions varies from the wide-angle end state to the telephoto end state, and also defines an appropriate range of the ratio of variation in the using magnification of the second lens group to that of the third lens group upon changing the state of lens group positions.

When the ratio D23W/Δ3 is equal to or exceeds the upper limit of conditional expression (14), variation in the using magnification of the second lens group becomes large upon changing the state of lens group positions.

In a variable focal length lens system according to the third embodiment of the present invention, the second lens group is the only negative lens group and has large refractive power. When the state of lens group positions changes from the wide-angle end state to the telephoto end state, off-axis rays passing through the second lens group vary largely. Accordingly, when the using magnification of the second lens group is varied largely upon changing the state of lens group positions, variation in off-axis aberration produced upon changing the state of lens group positions becomes large, so that high optical performance cannot be realized.

On the other hand, when the ratio is equal to or falls below the lower limit of conditional expression (14), variation in the using magnification of the third lens group upon changing the state of lens group positions becomes large. As described above, when the using magnification of the third lens group varies largely, variation in negative spherical aberration produced upon varying the using magnification becomes large, so that high optical performance cannot be realized.

In a variable focal length lens system according to the third embodiment of the present invention, in order to balance between compactness and high optical performance, the aperture stop is arranged near the object side of the third lens group and the aperture stop is moved together with the third lens group when the state of lens group positions and the following conditional expression (15) is preferably satisfied:

$$0.7 < \Sigma 3/fw < 1.5 \tag{15}$$

where Σ3 denotes a distance along the optical axis between the most image side lens surface of the third lens group and the aperture stop.

In order to satisfactory correct variation in off-axis aberrations produced upon changing the state of lens group positions, it is preferable to arrange an aperture stop at the central position of the lens system. For this purpose, in a variable focal length lens system according to the third embodiment of the present invention, the aperture stop is arranged between the second lens group and the third lens group and is moved together with the third lens group in a body as described above. Accordingly, the heights of off-axis ray passing through the first, second and fourth lens groups vary actively upon changing the state of lens group positions. At the same time, the height of off-axis ray passing through the third lens group, which has large positive refractive power, does not change significantly. Accordingly, a variable focal length lens system according to the third embodiment of the present invention can correct spherical aberration sufficiently.

Conditional expression (15) defines an appropriate range of the lens thickness of the third lens group. When the ratio Σ3/fw is equal to or exceeds the upper limit of conditional expression (15), improvement of portability is spoiled. As for a camera trying to improve portability, a so-called retractable type lens barrel, which can be housed in a camera body upon carrying and is put out upon using, is used frequently. In this case, in order to miniaturize a camera, it is indispensable that the thickness of each lens group is to be narrowed. However, when the thickness of the third lens group becomes large exceeding the upper limit of conditional expression (15), the lens thickness upon carrying becomes too large, so that compactness cannot be realized.

On the other hand, when the ratio is equal to or falls below the lower limit of conditional expression (15), variation in coma produced upon changing the angle of view in the wide-angle end state cannot be corrected well.

In a variable focal length lens system according to the third embodiment of the present invention, in order to improve further compactness and high optical performance, the second lens group includes a negative lens element arrange most object side, and at least a positive lens element arranged to the image side of the negative lens element and the following conditional expression (16) is preferably satisfied:

$$0.8 < \Sigma 2/fw < 1.8 \tag{16}$$

where Σ2 denotes a distance along the optical axis between the most object side lens surface and the most image side lens surface of the second lens group.

In a variable focal length lens system according to the third embodiment of the present invention, in order to miniaturize the lens diameter, it is preferable that a negative lens element is exist to the most object side of the second lens group. In a variable focal length lens system according to the third embodiment of the present invention, in order to move principal point of the second lens group to the object side as much as possible and to secure sufficient the back focal length in the wide-angle end state, at least one positive lens element is exist to the image side of the negative lens element. Moreover, in a variable focal length lens system according to the third embodiment of the present invention, in order to satisfy conditional expression (16), it is preferable that the distance along the optical axis between the most object side lens surface and the most image side lens surface of the second lens group is suitably set.

When the ratio Σ2/fw is equal to or exceeds the upper limit of conditional expression (16), off-axis ray passing through the first lens group leaves largely away from the optical axis. Accordingly, compactness of the lens diameter cannot be realized. On the other hand, when the ratio is equal to or falls below the lower limit of conditional expression (16), difference of the-height between off-axis ray passing through the second lens group and on-axis ray becomes small. Accordingly, variation in coma produced upon changing the angle of view cannot be corrected well.

In a variable focal length lens system according to the third embodiment of the present invention, in order to realize high optical performance by using as little lens elements as possible and to realize compactness of the lens system at the same time, it is desirable that the second lens element and the third lens element are constructed as described below.

It is preferable that the second lens group is composed of three lens elements that is, in order from the object, a first negative lens element having a concave surface facing to the image, a second negative lens element having a concave surface facing to the image, and a positive lens element having convex surface facing to the object. It is preferable that each lens element is arranged with putting an air space between adjoining elements. With this arrangement, the second lens group enables that the first negative lens element mainly corrects off-axis aberrations produced in the wide-angle end state, and the second negative lens element and the positive lens element mainly correct on-axis aberrations. Accordingly, the variable focal length lens system according to the third embodiment of the present invention can simplify its lens construction by separating aberration correction functions to each lens element in the second lens group.

Moreover, in a variable focal length lens system according to the third embodiment of the present invention, the second lens group having the above-described lens construction preferably satisfies the following conditional expression (17):

$$1 < f2P/|f2| < 2 \qquad (17)$$

where f2P denotes the focal length of the positive lens element in the second lens group, and f2 denotes the focal length of the second lens group.

Conditional expression (17) defines an appropriate range of the focal length of the positive lens element in the second lens group.

When the ratio f2P/|f2| is equal to or exceeds the upper limit of conditional expression (17), refractive index of each lens element composing the second lens group becomes small. Accordingly, off-axis ray passing through the second lens group leaves away from the optical axis, so it becomes difficult to further miniaturize the diameter of the lens system. On the other hands, when the ratio is equal to or falls below the lower limit of conditional expression (17), refractive index of each lens element composing the second lens group becomes large. Accordingly, variation in coma produced upon changing the state of lens group positions becomes difficult to be corrected satisfactory.

Then, it is preferable that the third lens group is constructed by, in order from the object, a positive lens element having a convex surface facing to the object, and a negative lens element having a concave surface facing to the image. In a variable focal length lens system according to the third embodiment of the present invention, since a negative lens element is not arranged in the vicinity of the image plane, negative distortion tends to be produced. Accordingly, by arranging a negative lens element to the image side of the positive lens element, the power arrangement of the whole lens system approach a symmetrical lens type. Thus, negative distortion can be corrected well.

In a variable focal length lens system according to the third embodiment of the present invention, the third lens group having the above-described construction preferably satisfies the following conditional expression (18):

$$0.6 < |f3N|/f3 < 1.4 \qquad (18)$$

where f3N denotes the focal length of the third lens group, and f3 denotes the focal length of the third lens group.

Conditional expression (18) defines an appropriate range of the focal length of the negative lens element of the third lens group.

When the ratio |f3N|/f3 is equal to or exceeds the upper limit of conditional expression (18), negative distortion produced in the wide-angle end state becomes impossible to be corrected well. On the other hand, when the ratio is equal to or falls below the lower limit of conditional expression (18), refractive index of each lens element of the third lens group becomes large. Accordingly, optical performance is severely degraded by minute decentering, so it becomes difficult to maintain optical quality upon manufacturing.

In a variable focal length lens system according to the third embodiment of the present invention, higher optical performance can be obtained by applying an aspherical lens element.

In particular, by constructing such that at least one surface of the negative lens element arranged to the most object side is an aspherical surface, off-axis aberrations produced in the wide-angle end state can be corrected satisfactory. Moreover, when both surfaces of the negative lens element are made to be aspherical surfaces, higher optical performance can be realized.

In particular, by constructing at least one surface of the third lens group to be an aspherical surface, coma produced on the periphery of the image frame in the wide-angle end state can be corrected well. In addition, it is preferable that a plurality of aspherical surfaces applied in a lens system, so higher optical performance can be realized.

In the variable focal length lens system according to the third embodiment of the present invention, in order to realize compactness, the number of lens elements is made to be as smaller as possible. However, higher optical performance can be realized by constructing, for example, at least one lens element of the three lens elements consisting of the third lens group by a cemented lens. Higher optical performance can be realized by constructing at least one lens element of the lens elements consisting of the second lens group by a cemented lens.

In the variable focal length lens system according to the third embodiment of the present invention, by shifting a lens group in the entirety thereof of the lens groups composing the lens system or a portion of a lens group substantially perpendicular to the optical axis image can be shifted. Accordingly, the variable focal length lens system according to the third embodiment of the present invention can be used as a vibration reduction optical system in combination with a vibration detector for detecting vibration of a camera, a driver for shifting above-described one lens group or a portion of a lens group, and a controller for controlling the driver to correct the vibration detected by the vibration detector.

In the variable focal length lens system according to the third embodiment of the present invention, it is suitable for suppressing variation in various aberrations to move from the second lens group to the fourth lens group to the object upon focusing a close object. In particular, in the following Examples, although the fourth lens group is composed of a positive lens element, in order to correct variation in off-axis aberrations produced upon focusing close object, the fourth lens group may be constructed by a cemented lens.

In the variable focal length lens system according to the third embodiment of the present invention, in order to prevent production of moiré pattern to the image side of the lens system, a low-pass filter or an infrared-cut filter in accordance with the frequency characteristic of the detector may be arranged.

The variable focal length lens system according to the third embodiment of the present invention can be applied to a so-called varifocal lens whose state of focal length does not exist continuously.

FIG. 1 is a diagram showing the power arrangement of a variable focal length lens system according to each Example of the present invention, in which W denotes a wide-angle end state and T denotes a telephoto end state.

The variable focal length lens system according to each Example of the third embodiment of the present invention is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from the wide-angle end state to the telephoto end state, the first lens group G1 and the third lens group G3 are moved to the object such that a distance between the first lens group G1 and the second lens group G2 increases, a distance between the second lens group G2 and the third lens group G3 decreases, and a distance between the third lens group G3 and the fourth lens group G4 increases. At this time, the second lens group G2 is at first moved to the image and then moved to the object. The fourth lens group G4 at first moved to the object and then moved to the image.

Incidentally, respective Examples 9 through 12 of the third embodiment are the same as Examples 1 through 4, respectively.

EXAMPLE 9

FIG. 2 is a diagram showing the lens arrangement of a variable focal length lens system according to Example 9 of the third embodiment of the present invention.

In the variable focal length lens system according to Example 9, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image.

The fourth lens group G4 is composed of a positive lens element L41 having a convex surface facing to the object.

In the variable focal length lens system according to Example 9, an aperture stop S is arranged to the object side of the third lens group G3 and is moved together with the third lens group G3 when the state of lens group positions varies.

Various values associated with Example 9 are listed in Table 9.

TABLE 9

[Specifications]

|   | Wide-angle end | Intermediate | Telephoto end |
|---|---|---|---|
| f= | 6.39 | 14.40 | 27.16 |
| FNO= | 2.88 | 4.07 | 4.57 |
| 2ω= | 75.21° | 35.49° | 19.12° |

[Lens Data]

| | r | d | n | ν |
|---|---|---|---|---|
| 1 | 40.2543 | 0.900 | 1.84666 | 23.78 |
| 2 | 26.0490 | 2.800 | 1.75500 | 52.32 |
| 3 | −1909.4996 | (D3) | 1.0 | |
| 4 | 37.9055 | 1.000 | 1.79450 | 45.40 |
| 5 | 7.0398 | 2.450 | 1.0 | |

TABLE 9-continued

[Specifications]

| 6 | −61.1984 | 0.700 | 1.77250 | 49.61 |
|---|---|---|---|---|
| 7 | 10.3694 | 1.200 | 1.0 | |
| 8 | 11.9637 | 1.800 | 1.84666 | 23.78 |
| 9 | 134.7168 | (D9) | 1.0 | |
| 10 | 0.0000 | 2.000 | 1.0 | Aperture Stop S |
| 11 | 5.3928 | 2.250 | 1.72916 | 54.66 |
| 12 | −42.5477 | 0.800 | 1.0 | |
| 13 | −16.5589 | 0.650 | 1.80809 | 22.76 |
| 14 | 13.3606 | 0.450 | 1.0 | |
| 15 | −12.4508 | 0.900 | 1.79450 | 45.40 |
| 16 | −11.0987 | (D16) | 1.0 | |
| 17 | 12.3487 | 2.300 | 1.49700 | 81.61 |
| 18 | −9944.9996 | (Bf) | 1.0 | |

[Aspherical Surface Data]
Surface Number=5
κ=−2.5765
$C_4$=+1.1581×10$^{-3}$
$C_6$=−9.5500×10$^{-6}$
$C_8$=+2.2307×10$^{-8}$
$C_{10}$=+4.0283×10$^{-9}$
Surface Number=15
κ=8.1170
$C_4$=+7.3841×10$^{-4}$
$C_6$=+3.9143×10$^{-4}$
$C_8$=−1.0685×10$^{-5}$
$C_{10}$=−3.0515×10$^{-8}$
Surface Number=16
κ=−9.0000
$C_4$=+7.9978×10$^{-4}$
$C_6$=+4.2205×10$^{-4}$
$C_8$=−1.0964×10$^{-5}$
$C_{10}$=+1.0713×10$^{-6}$

[Variable Distance Data]

| | Wide-angle end | Intermediate | Telephoto end |
|---|---|---|---|
| f | 6.3854 | 14.3998 | 27.1599 |
| D3 | 0.7000 | 10.3807 | 17.4976 |
| D9 | 12.6680 | 3.6276 | 0.5852 |
| D16 | 6.2413 | 11.1178 | 21.0512 |
| BF | 6.0304 | 7.7015 | 6.0299 |

[Values for Conditional Expressions]
f2P=+15.4040
f2=−9.6564
f3N=−9.0625
f3=+12.7420
(12) Δ1/(Z·(fw·ft)$^{1/2}$)=0.349
(13) D34W/fw=0.978
(14) D23W/Δ3=0.990
(15) Σ3/fw=1.104
(16) Σ2/fw=1.120
(17) f2P/|f2|=1.595
(18) |f3N|/f3=0.771

FIGS. 3A, 3B, and 3C graphically show various aberrations of the variable focal length lens system according to Examples 9 of the third embodiment of the present invention in a wide-angle end state (f=6.39), an intermediate focal length state (f=14.40), and a telephoto end state (f=27.16), respectively when the system is focused at infinity.

As is apparent from the respective graphs, the variable focal length lens system according to Example 9 shows superb optical performance as a result of good corrections to various aberrations.

EXAMPLE 10

FIG. 4 is a diagram showing the lens arrangement of a variable focal length lens system according to Example 10 of the third embodiment of the present invention.

In the variable focal length lens system according to Example 10, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image.

The fourth lens group G4 is composed of a positive lens element L41 having a convex surface facing to the object.

In the variable focal length lens system according to Example 10, an aperture stop S is arranged to the object side of the third lens group G3 and is moved together with the third lens group G3 when the state of lens group positions varies.

Various values associated with Example 10 are listed in Table 10.

TABLE 10

[Specifications]

|   | Wide-angle end | Intermediate | Telephoto end |
|---|---|---|---|
| f = | 6.70 | 14.60 | 27.13 |
| FNO = | 2.88 | 3.84 | 4.78 |
| 2ω = | 72.72° | 35.08° | 19.27° |

[Lens Data]

| | r | d | n | ν |
|---|---|---|---|---|
| 1 | 38.2542 | 0.900 | 1.84666 | 23.78 |
| 2 | 26.4710 | 2.500 | 1.77250 | 49.61 |
| 3 | 155.9562 | (D3) | 1.0 | |
| 4 | 36.3311 | 1.000 | 1.79450 | 45.40 |
| 5 | 7.7749 | 2.650 | 1.0 | |
| 6 | −76.4394 | 0.700 | 1.75500 | 52.32 |
| 7 | 12.5365 | 1.650 | 1.0 | |
| 8 | 14.2461 | 1.800 | 1.84666 | 23.78 |
| 9 | 101.9364 | (D9) | 1.0 | |
| 10 | 0.0000 | 1.700 | 1.0 | Aperture Stop S |
| 11 | 5.9506 | 2.150 | 1.72916 | 54.66 |
| 12 | −121.3146 | 1.000 | 1.0 | |
| 13 | −25.5408 | 0.650 | 1.80809 | 22.76 |
| 14 | 11.8809 | 0.500 | 1.0 | |
| 15 | −19.0549 | 0.900 | 1.69350 | 53.22 |
| 16 | −11.2921 | (D16) | 1.0 | |
| 17 | 23.5288 | 1.350 | 1.75500 | 52.32 |
| 18 | 0.0000 | (Bf) | 1.0 | |

[Aspherical Surface Data]
Surface Number=5
κ=−3.3630
$C_4$=+1.0617×10$^{-3}$
$C_6$=−1.6626×10$^{-5}$
$C_8$=+3.2651×10$^{-7}$
$C_{10}$=−2.2032×10$^{-9}$
Surface Number=15
κ=11.0000
$C_4$=3.1648×10$^{-4}$
$C_6$=+1.0222×10$^{-4}$
$C_8$=+1.7755×10$^{-5}$
$C_{10}$=−9.2894×10$^{-7}$
Surface Number=16
κ=−1.4398
$C_4$=+5.8112×10$^{-4}$
$C_6$=+1.2537×10$^{-4}$
$C_8$=+1.3154×10$^{-5}$
$C_{10}$=−1.7033×10$^{-7}$

[Variable Distance Data]

| | Wide-angle end | Intermediate | Telephoto end |
|---|---|---|---|
| f | 6.6999 | 14.5999 | 27.1315 |
| D3 | 0.7000 | 11.3350 | 21.4250 |
| D9 | 16.0590 | 5.7222 | 0.9432 |
| D16 | 8.0203 | 14.0854 | 20.0819 |
| BF | 6.0303 | 6.0303 | 6.0300 |

[Values for Conditional Expressions]
f2P=+19.3774
f2=−11.261
f3N=−9.9573
f3=+13.6010
(12) $\Delta 1/(Z \cdot (fw \cdot ft)^{1/2})$=0.324
(13) D34W/fw=1.197
(14) D23W/Δ3=1.472
(15) Σ3/fw=1.045
(16) Σ2/fw=1.164
(17) f2P/|f2|=1.721
(18) |f3N|/f3=0.732

FIGS. 5A, 5B, and 5C graphically show various aberrations of the variable focal length lens system according to Examples 10 of the present invention in a wide-angle end state (f=6.70), an intermediate focal length state (f=14.60), and a telephoto end state (f=27.13), respectively when the system is focused at infinity.

As is apparent from the respective graphs, the variable focal length lens system according to Example 10 shows superb optical performance as a result of good corrections to various aberrations.

EXAMPLE 11

FIG. 6 is a diagram showing the lens arrangement of a variable focal length lens system according to Example 11 of the third embodiment of the present invention.

In the variable focal length lens system according to Example 11, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image.

The fourth lens group G4 is composed of a positive lens element L41 having a convex surface facing to the object.

In the variable focal length lens system according to Example 11, an aperture stop S is arranged to the object side of the third lens group G3 and is moved together with the third lens group G3 when the state of lens group positions varies.

Various values associated with Example 11 are listed in Table 11.

TABLE 11

[Specifications]

| | Wide-angle end | Intermediate | Telephoto end |
|---|---|---|---|
| f = | 7.20 | 15.00 | 27.13 |
| FNO = | 2.88 | 3.60 | 4.70 |
| 2ω = | 68.77° | 34.24° | 19.13° |

[Lens Data]

| | r | d | n | ν |
|---|---|---|---|---|
| 1 | 39.0896 | 0.900 | 1.84666 | 23.78 |
| 2 | 26.1740 | 2.400 | 1.75500 | 52.32 |
| 3 | 847.0754 | (D3) | 1.0 | |
| 4 | 29.8433 | 1.000 | 1.79450 | 45.40 |
| 5 | 6.2925 | 2.350 | 1.0 | |
| 6 | −26.6454 | 0.700 | 1.77250 | 49.61 |
| 7 | 17.2580 | 0.750 | 1.0 | |
| 8 | 13.0478 | 1.700 | 1.84666 | 23.78 |
| 9 | 7831.4595 | (D9) | 1.0 | |
| 10 | 0.0000 | 1.700 | 1.0 | Aperture Stop S |
| 11 | 5.3972 | 2.250 | 1.75500 | 52.32 |
| 12 | −53.8427 | 0.450 | 1.0 | |
| 13 | −42.8393 | 0.650 | 1.80809 | 22.76 |
| 14 | 8.9800 | 0.550 | 1.0 | |
| 15 | −17.4827 | 0.900 | 1.79450 | 45.40 |
| 16 | −14.0668 | (D16) | 1.0 | |
| 17 | 16.6627 | 1.700 | 1.60300 | 65.47 |
| 18 | −9944.9996 | (Bf) | 1.0 | |

[Aspherical Surface Data]
Surface Number=5
κ=−2.1043
$C_4$=+1.4570×10$^{-3}$
$C_6$=−8.7419×10$^{-6}$
$C_8$=+4.6555×10$^{-8}$
$C_{10}$=+9.7870×10$^{-9}$
Surface Number=15
κ=4.5475
$C_4$=−5.7196×10$^{-4}$
$C_6$=+1.7009×10$^{-4}$
$C_8$=+1.6752×10$^{-5}$
$C_{10}$=−1.2084×10$^{-6}$
Surface Number=16
κ=−8.0776
$C_4$=+5.4710×10$^{-4}$
$C_6$=+2.2019×10$^{-4}$
$C_8$=+1.1611×10$^{-5}$
$C_{10}$=+1.1219×10$^{-7}$

[Variable Distance Data]

| | Wide-angle end | Intermediate | Telephoto end |
|---|---|---|---|
| f | 7.2028 | 14.9999 | 27.1330 |
| D3 | 0.7000 | 10.2814 | 17.8673 |
| D9 | 11.8980 | 3.6587 | 0.8000 |
| D16 | 7.6709 | 11.1235 | 19.7736 |
| BF | 6.0304 | 7.0303 | 6.302 |

[Values for Conditional Expressions]
f2P=+15.4351
f2=−10.1618
f3N=−9.1357
f3=+12.5015
(12) Δ1/(Z·(fw·ft)$^{1/2}$)=0.345
(13) D34W/fw=1.065
(14) D23W/Δ3=1.124
(15) Σ3/fw=0.902
(16) Σ2/fw=0.902
(17) f2P/|f2|=1.519
(18) |f3N|/f3=0.731

FIGS. 7A, 7B, and 7C graphically show various aberrations of the variable focal length lens system according to Examples 11 of the present invention in a wide-angle end state (f=7.20), an intermediate focal length state (f=15.00), and a telephoto end state (f=27.13), respectively when the system is focused at infinity.

As is apparent from the respective graphs, the variable focal length lens system according to Example 11 shows superb optical performance as a result of good corrections to various aberrations.

EXAMPLE 12

FIG. 8 is a diagram showing the lens arrangement of a variable focal length lens system according to Example 12 of the third embodiment of the present invention.

In the variable focal length lens system according to Example 12, the first lens group G1 is composed of, in order from the object, a cemented lens constructed by a negative meniscus lens L11 having a convex surface facing to the object cemented with a positive lens L12 having a convex surface facing to the object.

The second lens group G2 is composed of, in order from the object, a negative lens element L21 having a concave surface facing to the image, a negative lens element L22 having a concave surface facing to the image, and a positive lens element L23 having a convex surface facing to the object.

The third lens group G3 is composed of, in order from the object, a double convex positive lens element L31, a negative lens element L32 having a concave surface facing to the image, and a positive lens element L33 having a convex surface facing to the image The fourth lens group G4 is composed of a positive lens element L41 having a convex surface facing to the object.

In the variable focal length lens system according to Example 12, a glass block B is arranged between the fourth lens group G4 and the image plane I. The glass block B has functions of a low-pass filter to eliminate higher spatial frequency than the resolution limit of the imaging device arranged on the image plane I and a cover glass to protect the imaging device. An aperture stop S is arranged to the object side of the third lens group G3 and is moved together with the third lens group G3 when the state of lens group positions varies.

Various values associated with Example 12 are listed in Table 12.

TABLE 12

[Specifications]

| | Wide-angle end | Intermediate | Telephoto end |
|---|---|---|---|
| f = | 6.45 | 15.00 | 24.30 |
| FNO = | 2.88 | 3.75 | 4.50 |
| 2ω = | 74.84° | 34.56° | 21.72° |

[Lens Data]

| | r | d | n | ν | |
|---|---|---|---|---|---|
| 1 | 35.5670 | 0.900 | 1.84666 | 23.78 | |
| 2 | 25.2949 | 3.000 | 1.81600 | 46.63 | |
| 3 | 81.7907 | (D3) | 1.0 | | |
| 4 | 55.7736 | 0.950 | 1.69350 | 53.22 | |
| 5 | 9.0909 | 4.000 | 1.0 | | |
| 6 | −17.9746 | 0.800 | 1.65160 | 58.54 | |
| 7 | 11.2326 | 1.650 | 1.0 | | |
| 8 | 16.8117 | 2.600 | 1.80610 | 33.27 | |
| 9 | −58.3068 | (D9) | 1.0 | | |
| 10 | 0.0000 | 0.500 | 1.0 | | Aperture Stop S |
| 11 | 5.6321 | 2.700 | 1.49700 | 81.61 | |
| 12 | −25.0030 | 1.700 | 1.0 | | |
| 13 | −10.2813 | 0.800 | 1.84666 | 23.83 | |
| 14 | −38.8327 | 0.650 | 1.0 | | |
| 15 | −6.3119 | 1.150 | 1.58913 | 61.18 | |
| 16 | −6.0000 | (D16) | 1.0 | | |
| 17 | 25.0008 | 1.500 | 1.60300 | 65.47 | |
| 18 | 0.0000 | (D18) | 1.0 | | |
| 19 | 0.0000 | 3.260 | 1.51633 | 64.14 | Glass Block |
| 20 | 0.0000 | (Bf) | 1.0 | | |

[Aspherical Surface Data]
Surface Number=4
$\kappa=11.0000$
$C_4=+8.6165\times10^{-5}$
$C_6=-5.7772\times10^{-7}$
$C_8=+4.8229\times10^{-9}$
$C_{10}=+1.9002\times10^{-12}$
Surface Number=15
$\kappa=2.5931$
$C_4=-4.2473\times10^{-4}$
$C_6=+8.0084\times10^{-5}$
$C_8=+2.0467\times10^{-5}$
$C_{10}=-5.5844\times10^{-7}$
Surface Number=16
$\kappa=1.0000$
$C_4=+2.4812\times10^{-4}$
$C_6=+8.0084\times10^{-5}$
$C_8=+1.4345\times10^{-5}$
$C_{10}=-3.5453\times10^{-7}$

[Variable Distance Data]

| | Wide-angle end | Intermediate | Telephoto end |
|---|---|---|---|
| f | 6.4500 | 15.0000 | 24.2971 |
| D3 | 0.7000 | 13.6869 | 20.2971 |
| D9 | 21.5550 | 7.2060 | 1.9990 |
| D16 | 8.5440 | 14.5889 | 19.8175 |
| D18 | 1.0000 | 1.0000 | 1.0000 |
| BF | 2.4410 | 2.4410 | 2.4410 |

[Values for Conditional Expressions]
f2P=+16.4421
f2=−12.0859
f3N=−16.7312
f3=+14.9978
(12) $\Delta 1/(Z\cdot(fw\cdot ft)^{1/2})=00.240$
(13) D34W/fw=1.325
(14) D23W/Δ3=1.956
(15) Σ3/ fw=1.163
(16) Σ2/fw=1.550
(17) f2P/|f2|=1.360
(18) |f3N|/f3=1.116

FIGS. 9A, 9B, and 9C graphically show various aberrations of the variable focal length lens system according to Examples 12 of the present invention in a wide-angle end state (f=6.50), an intermediate focal length state (f=15.00), and a telephoto end state (f=24.30), respectively when the system is focused at infinity.

As is apparent from the respective graphs, the variable focal length lens system according to Example 12 shows superb optical performance as a result of good corrections to various aberrations.

As described above, the first embodiment of the present invention makes it possible to provide a variable focal length lens system capable of realizing compactness and high optical performance. It is possible to realize a variable focal length lens system having relatively short in the total lens length in the wide-angle end state and small variation in the total lens length.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A variable focal length lens system comprising four lens groups that are, in order from an object:
   a first lens group having positive refractive power;
   a second lens group having negative refractive power;
   a third lens group having positive refractive power; and
   a fourth lens group having positive refractive power;
   when the state of lens group positions varies from a wide-angle end state to a telephoto end state, at least the first lens group and the third lens group being moved to the object such that:
      a distance between the first lens group and the second lens group increases;
      a distance between the second lens group and the third lens group decreases; and
      a distance between the third lens group and the fourth lens group increases;
   an aperture stop being arranged in the vicinity of the third lens group;
   the second lens group being composed of three lens elements that are, in order from the object:
      a first negative lens element having a concave surface facing to the image;
      a second negative lens element having a concave surface facing to the image; and
      a positive lens element having a convex surface facing to the object; and
   the following conditional expression being satisfied:

$3<(R24+R25)/fw<5$ where R24 denotes the radius of curvature of the image side surface of the second negative lens element in the second lens group, R25 denotes the radius of curvature of the object side surface of the positive lens element in the second lens group, and fw denotes the focal length of the variable focal length lens system in the wide-angle end state, wherein the first lens group is composed of a cemented positive lens constructed by a negative meniscus lens having a convex surface facing to the object cemented with a positive lens having a convex surface facing to the object, and the following conditional expression is satisfied:

$$3<R11/fw<5$$

where R11 denotes a radius of curvature of the object side surface of the cemented positive lens in the first lens group.

2. The variable focal length lens system according to claim 1, wherein;

the first negative lens element and the second negative lens element are arranged with an air space therebetween;

the second negative lens element and the positive lens element are arranged with an air space therebetween; and the following conditional expression is satisfied:

$$0.7<\Sigma 2/fw<2.1$$

where $\Sigma 2$ denotes a distance along the optical axis between the most object side lens surface and the most image side lens surface in the second lens group.

3. The variable focal length lens system according to claim 2, wherein the first negative lens element has a meniscus shape having a concave surface facing to the image, and the following conditional expression is satisfied:

$$0.5<R22/fw<2$$

where R22 denotes a radius of curvature of the image side surface of the first negative lens element in the second lens group.

4. The variable focal length lens system according to claim 3, wherein the third lens group includes, in order from the object;

a first subgroup having positive refractive power located to the most object side; and a second subgroup having negative refractive power located adjacent to the first subgroup; and the first subgroup and the second subgroup are located with an air space therebetween; and the following conditional expression is satisfied:

$$0.02<D2/f3<0.16$$

where D2 denotes a distance along the optical axis between the first subgroup and the second subgroup in the third lens group, and f3 denotes the focal length of the third lens group.

5. The variable focal length lens system according to claim 4, wherein at least one of the following conditional expressions is satisfied:

$$3<f1/(fw \cdot ft)^{1/2}<7.5$$

$$0.6<|f2|/(fw \cdot ft)^{1/2}<1.1$$

where f1 denotes the focal length of the first lens group, f2 denotes the focal length of the second lens group, and ft denotes the focal length of the variable focal length lens system in the telephoto end state.

6. The variable focal length lens system according to claim 1, wherein the first negative lens element has a meniscus shape having a concave surface facing to the image, and the following conditional expression is satisfied:

$$0.5<R22/fw<2$$

where R22 denotes a radius of curvature of the image side surface of the first negative lens element in the second lens group.

7. The variable focal length lens system according to claim 1, wherein the third lens group is composed of, in order from the object;

a first subgroup having positive refractive power; and a second subgroup having negative refractive power;

the first subgroup and the second subgroup are arranged with an air space therebetween, and the following conditional expression is satisfied:

$$0.02<D2/f3<0.16$$

where D2 denotes a distance along the optical axis between the first subgroup and the second subgroup in the third lens group, and f3 denotes the focal length of the third lens group.

8. The variable focal length lens system according to claim 1, wherein at least one of the following conditional expressions is satisfied:

$$3<f1/(fw \cdot ft)^{1/2}<7.5$$

$$0.6<|f2|/(fw \cdot ft)^{1/2}<1.1$$

where f1 denotes the focal length of the first lens group, f2 denotes the focal length of the second lens group, and ft denotes the focal length of the variable focal length lens system in the telephoto end state.

9. The variable focal length lens system according to claim 1, wherein the third lens group includes, in order from the object:

a first subgroup having positive refractive power located to the most object side; and a second subgroup having negative refractive power located adjacent to the first subgroup;

the first subgroup and the second subgroup are located with an air space in between; and the following conditional expression is satisfied:

$$0.02<D2/f3<0.16$$

where D2 denotes a distance along the optical axis between the first subgroup and the second subgroup in the third lens group, and f3 denotes the focal length of the third lens group.

10. A variable focal length lens system comprising four lens groups that are, in order from an object:

a first lens group having positive refractive power;

a second lens group having negative refractive power;

a third lens group having positive refractive power; and a fourth lens group having positive refractive power;

when the state of lens group positions varies from a wide-angle end state to a telephoto end state, the first lens group being moved to the object such that:

a distance between the first lens group and the second lens group increases;

a distance between the second lens group and the third lens group decreases; and a distance between the third lens group and the fourth lens group varies;

an aperture stop being arranged adjacent to the object side of the third lens group;

the third lens group being composed of three lens elements that are, in order from the object, a positive lens element, a negative lens element, and a positive lens element; and the following conditional expression being satisfied:

$$0.5<Da/fw<1.5$$

where Da denotes a distance along the optical axis between the most object side lens surface and the most image side lens surface of the third lens group, and fw denotes the focal length of the variable focal length lens system in the wide-angle end state, wherein when the state of lens group positions varies from the wide-angle end state to the telephoto end state, the first lens group and the third lens group are moved to the object such that the distance between the third lens group and the fourth lens group increases, and the following conditional expression is satisfied:

$1 < \Delta 1/(fw \cdot ft)^{1/2} < 2$ where $\Delta 1$ denotes a moving amount of the first lens group upon changing the state of lens group positions from the wide-angle end state to the telephoto end state, and ft denotes the focal length of the variable focal length lens system in the telephoto end state.

11. The variable focal length lens system according to claim 10, wherein the second lens group is composed of three lens elements that are, in order from the object:

a first negative lens element having a concave surface facing to the image;

a second negative lens element having a concave surface facing to the image; and a positive lens element having a convex surface facing to the object; and the following conditional expression is satisfied:

$0.03 < D23/|f2| < 0.20$ where D23 denotes a distance between the second negative lens element and the positive lens element in the second lens group, and f2 denotes the focal length of the second lens group.

12. The variable focal length lens system according to claim 11, wherein the first lens group is composed of a cemented positive lens constructed by a negative meniscus lens having a convex surface facing to the object cemented with a positive lens and the following conditional expression is satisfied:

$D1/R1 < (fw^2/(fw^2 + y_{max}^2))^{1/2}$ where D1 denotes a distance along the optical axis between the most object side lens surface of the first lens group and the aperture stop in the wide-angle end state, R1 denotes a radius of curvature of the most object side lens surface of the first lens group, and $y_{max}$ denotes the maximum image height.

13. The variable focal length lens system according to claim 10, wherein the first lens group is composed of a cemented positive lens constructed by a negative meniscus lens having a convex surface facing to the object cemented with a positive lens and the following conditional expression is satisfied:

$D1/R1 < (fw^2/(fw^2 + y_{max}^2))^{1/2}$ where D1 denotes a distance along the optical axis between the most object side lens surface of the first lens group and the aperture stop in the wide-angle end state, R1 denotes a radius of curvature of the most object side lens surface of the first lens group, and $y_{max}$ denotes the maximum image height.

14. A variable focal length lens system comprising four lens groups that are, in order from an object:

a first lens group having positive refractive power;

a second lens group having negative refractive power;

a third lens group having positive refractive power; and a fourth lens group having positive refractive power;

when the state of lens group positions varies from a wide-angle end state to a telephoto end state, at least the first lens group and the third lens group being moved to the object and the second lens group being moved at first to the image and then to the object such that:

a distance between the first lens group and the second lens group increases;

a distance between the second lens group and the third lens group decreases; and a distance between the third lens group and the fourth lens group increases;

an aperture stop being arranged in the vicinity of the third lens group and being moved with the third lens group upon changing the state of lens group positions; and the following conditional expressions being satisfied:

$0.15 < \Delta 1/(Z \cdot (fw \cdot ft)^{1/2}) < 0.5$ $0.6 < D34W/fw < 1.7$ where $\Delta 1$ denotes a moving amount of the first lens group upon changing the state of lens group positions from the wide-angle end state to the telephoto end state, fw denotes the focal length of the variable focal length lens system in the wide-angle end state, ft denotes the focal length of the variable focal length lens system in the telephoto end state, Z denotes the zoom ratio (ft/fw), and D34W denotes a distance along the optical axis between the third lens group and the fourth lens group in the wide-angle end state, wherein the second lens group includes:

a negative lens element located the most object side; and at least one positive lens element located to the image side of the negative lens element; and the following conditional expression is satisfied:

$0.8 < \Sigma 2/fw < 1.8$ where $\Sigma 2$ denotes a distance along the optical axis between the most object side lens surface and the most image side lens surface of the second lens group.

15. The variable focal length lens system according to claim 14, wherein the following conditional expression is satisfied:

$0.7 < D23W/\Delta 3 < 2.5$ where D23W denotes a distance between the second lens group and the third lens group in the wide-angle end state, and $\Delta 3$ denotes a moving amount of the third lens group upon changing the state of lens group positions from the wide-angle end state to the telephoto end state.

16. The variable focal length lens system according to claim 15, wherein the aperture stop is arranged in the vicinity to the object side of the third lens group and the following conditional expression is satisfied:

$0.7 < \Sigma 3/fw < 1.5$ where $\Sigma 3$ denotes a distance along the optical axis between the aperture stop and the most image side lens surface of the third lens group.

17. The variable focal length lens system according to claim 16, wherein the second lens group is composed of three lens elements that are, in order from the object:

a negative lens element having a concave surface facing to the image;

a negative lens element having a concave surface facing to the image; and a positive lens element having a convex surface facing to the object;

each of the three lens elements is separated from another thereof with an air space; and the following conditional expression is satisfied:

$$1 < f2P/|f2| < 2$$

where f2P denotes the focal length of the positive lens element in the second lens group, and f2 denotes the focal length of the second lens group.

18. The variable focal length lens system according to claim 17, wherein the third lens group includes, in order from the object:

a positive lens element having a convex surface facing to the object; and a negative lens element having a concave surface facing to the object; and the following conditional expression is satisfied:

$$0.6 < |f3N|/f3 < 1.4$$

where f3N denotes the focal length of the negative lens element in the third lens group and f3 denotes the focal length of the third lens group.

19. The variable focal length lens system according to claim 14, wherein the aperture stop is arranged in the vicinity to the object side of the third lens group and the following conditional expression is satisfied:

$$0.7 < \Sigma 3/fw < 1.5$$

where Σ3 denotes a distance along the optical axis between the aperture stop and the most image side lens surface of the third lens group.

20. The variable focal length lens system according to claim 14, wherein the second lens group is composed of three lens elements that are, in order from the object:

a negative lens element having a concave surface facing to the image;

a negative lens element having a concave surface facing to the image; and a positive lens element having a convex surface facing to the object;

each of the three lens elements is separated from another thereof with an air space; and the following conditional expression is satisfied:

$$1 < f2P/|f2| < 2$$

where f2P denotes the focal length of the positive lens element in the second lens group, and f2 denotes the focal length of the second lens group.

21. The variable focal length lens system according to claim 14, wherein the third lens group includes, in order from the object:

a positive lens element having a convex surface facing to the object; and a negative lens element having a concave surface facing to the object; and the following conditional expression is satisfied:

$$0.6 < |f3N|/f3 < 1.4$$

where f3N denotes the focal length of the negative lens element in the third lens group and f3 denotes the focal length of the third lens group.

22. A variable focal length lens system comprising four lens groups that are, in order from an object:

a first lens group having positive refractive power;

a second lens group having negative refractive power;

a third lens group having positive refractive power; and a fourth lens group having positive refractive power;

when the state of lens group positions varies from a wide-angle end state to a telephoto end state, at least the first lens group and the third lens group being moved to the object and the second lens group being moved at first to the image and then to the object such that:

a distance between the first lens group and the second lens group increases;

a distance between the second lens group and the third lens group decreases; and a distance between the third lens group and the fourth lens group increases;

an aperture stop being arranged in the vicinity of the third lens group and being moved with the third lens group upon changing the state of lens group positions; and the following conditional expressions being satisfied:

$$0.15 < \Delta 1/(Z \cdot (fw \cdot ft)^{1/2}) < 0.5$$

$$0.6 < D34W/fw < 1.7$$

where Δ1 denotes a moving amount of the first lens group upon changing the state of lens group positions from the wide-angle end state to the telephoto end state, fw denotes the focal length of the variable focal length lens system in the wide-angle end state, ft denotes the focal length of the variable focal length lens system in the telephoto end state, Z denotes the zoom ratio (ft/fw), and D34W denotes a distance along the optical axis between the third lens group and the fourth lens group in the wide-angle end state, wherein the aperture stop is arranged in the vicinity to the object side of the third lens group and the following conditional expression is satisfied:

$$0.7 < \Sigma 3/fw < 1.5$$

where Σ3 denotes a distance along the optical axis between the aperture stop and the most image side lens surface of the third lens group.

* * * * *